(12) United States Patent
Kurita

(10) Patent No.: US 11,323,351 B2
(45) Date of Patent: May 3, 2022

(54) COMMUNICATION DEVICE AND COMMUNICATION METHOD FOR PROCESSING AUTHENTICATION INFORMATION

(71) Applicant: FUJITSU LIMITED, Kawasaki (JP)

(72) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 16/679,821

(22) Filed: Nov. 11, 2019

(65) Prior Publication Data
US 2020/0204471 A1 Jun. 25, 2020

(30) Foreign Application Priority Data
Dec. 20, 2018 (JP) .............................. JP2018-237855

(51) Int. Cl.
*H04L 12/26* (2006.01)
*H04L 43/10* (2022.01)
(Continued)

(52) U.S. Cl.
CPC ............ *H04L 43/10* (2013.01); *H04L 9/0861* (2013.01); *H04L 43/08* (2013.01); *H04L 63/0853* (2013.01); *H04L 63/0876* (2013.01)

(58) Field of Classification Search
CPC ........ H04L 43/10; H04L 9/085; H04L 9/0861
See application file for complete search history.

(56) References Cited

U.S. PATENT DOCUMENTS

| | | | |
|---|---|---|---|
| 2003/0065708 A1 | 4/2003 | Jacobs et al. | |
| 2011/0022883 A1* | 1/2011 | Hansen | G06F 11/2035 714/2 |
| 2011/0202755 A1* | 8/2011 | Orsini | G06F 21/602 713/151 |

FOREIGN PATENT DOCUMENTS

| | | |
|---|---|---|
| JP | 2005-502957 | 1/2005 |
| JP | 2013-020313 | 1/2013 |

OTHER PUBLICATIONS

Bing Wu et al., Secure and Efficient Key Management in Mobile Ad Hoc Networks, Apr. 2005, IEEE International Parallel and Distributed Processing Symposium, pp. 1-8 (Year: 2005).*

(Continued)

*Primary Examiner* — Esther B. Henderson
(74) *Attorney, Agent, or Firm* — Fujitsu Patent Center

(57) ABSTRACT

A communication device includes a processor. The processor monitors a first message that is periodically transmitted from a representative device in a first network. The processor transmits a second message to the communication devices in the first network when the first message is not detected. When plural data components obtained by dividing authentication information have been distributed from the representative device plural communication devices in the first network, the processor receives data components transmitted from the communication devices in the first network in response to the second message. When a specified number of data components are received, the processor regenerates the authentication information from the specified number of data components. The processor generates new authentication information by rewriting at least a portion of the regenerated authentication information. The processor connects to a second network based on the new authentication information.

9 Claims, 22 Drawing Sheets

(51) Int. Cl.
  *H04L 9/08*  (2006.01)
  *H04L 43/08*  (2022.01)
  *H04L 29/06*  (2006.01)

(56) References Cited

OTHER PUBLICATIONS

EESR—Extended European Search Report dated Mar. 11, 2020 in corresponding European Patent Application No. 19207396.3.
Mohammad Sheikh Zefreh et al., "A Distributed Certificate Authority and Key Establishment Protocol for Mobile Ad Hoc Networks", Advanced Communication Technology, 2008. 10th International Conference on, IEEE, Piscataway, NJ, USA Feb. 17, 2008, pp. 1157-1162.
Rajdeep Singh et al., "Secured Approach to Routing in Mobile Ad Hoc Networks", International Journal of Computer Applications, vol. 38, No. 5, Jan. 5, 2012, pp. 39-43.

* cited by examiner

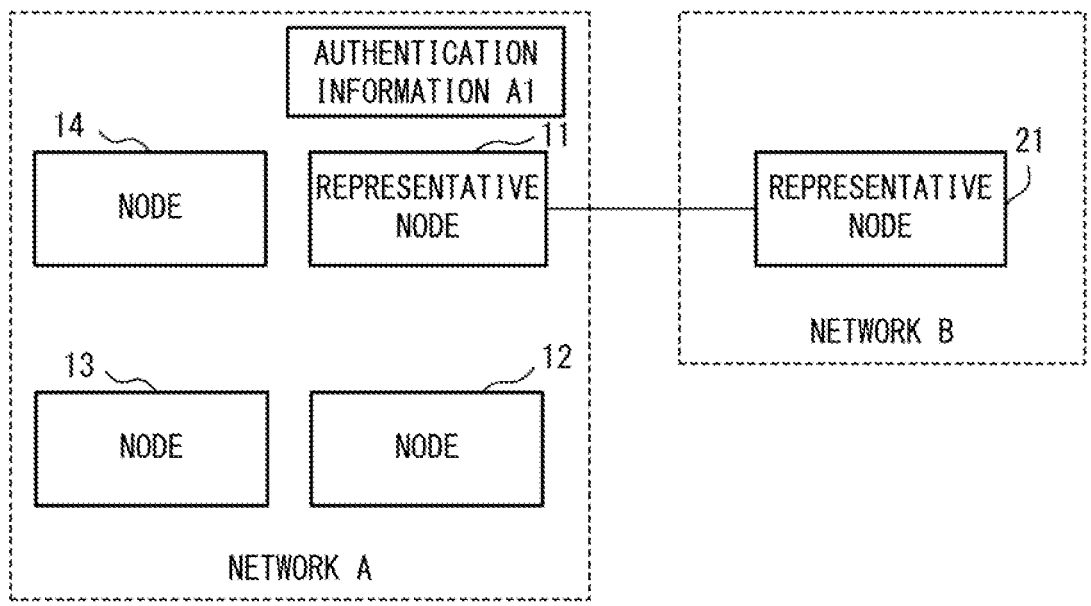
F I G. 2 A
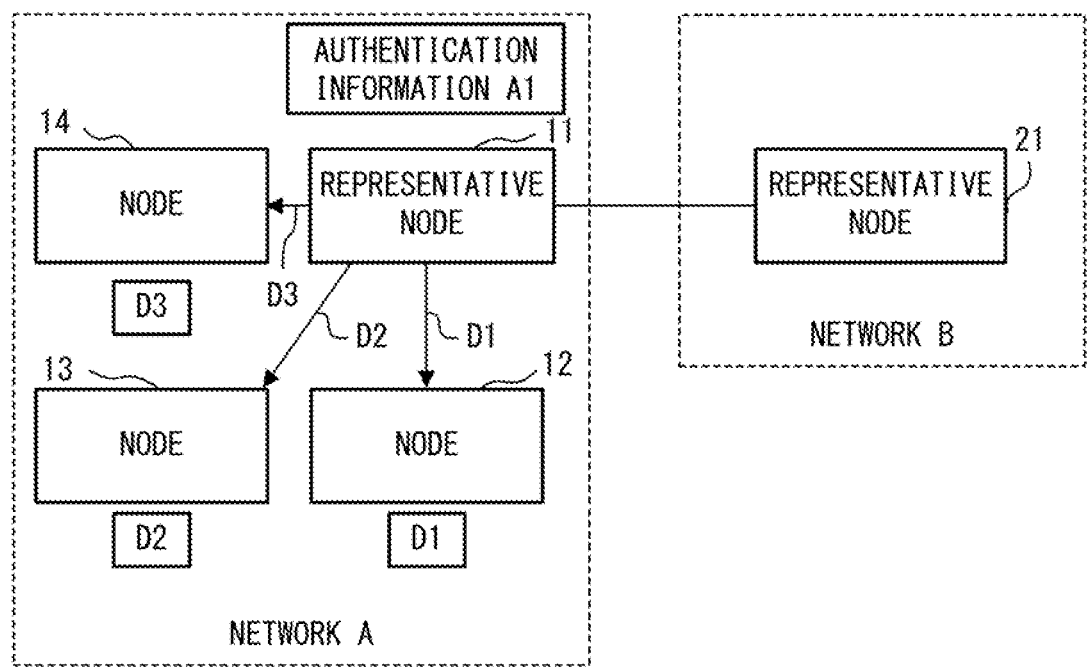
F I G. 2 B

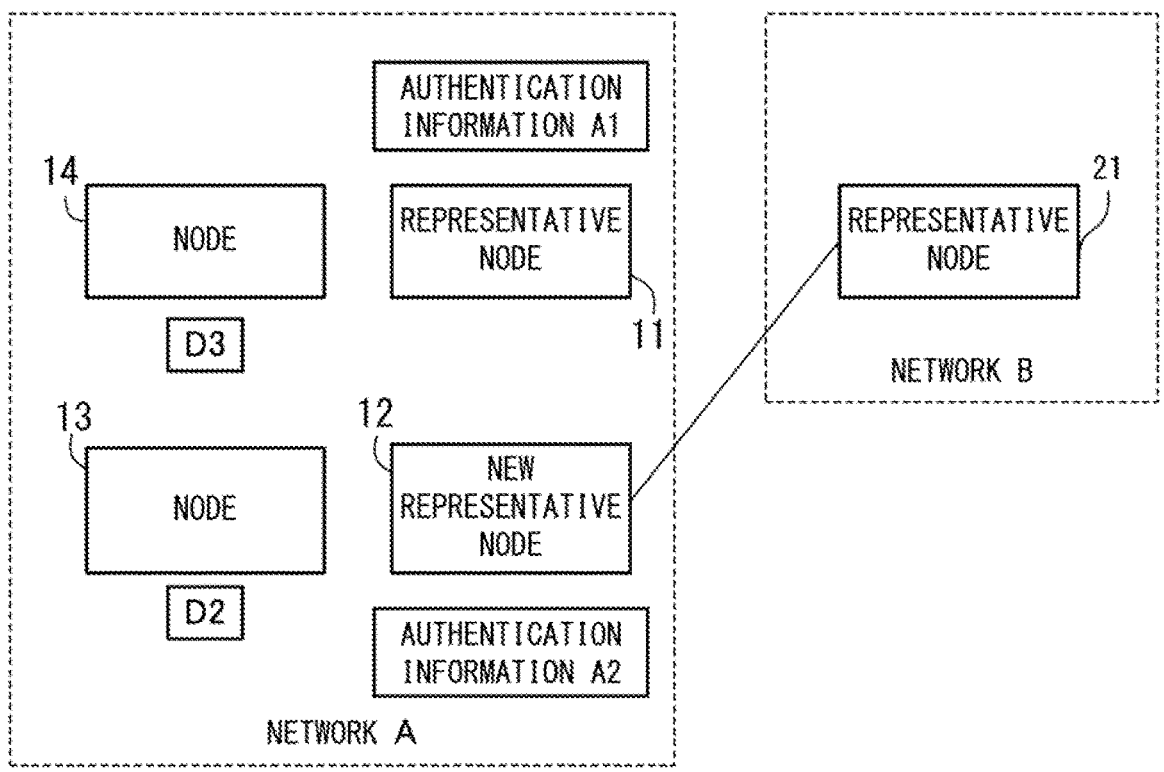
F I G. 5 A
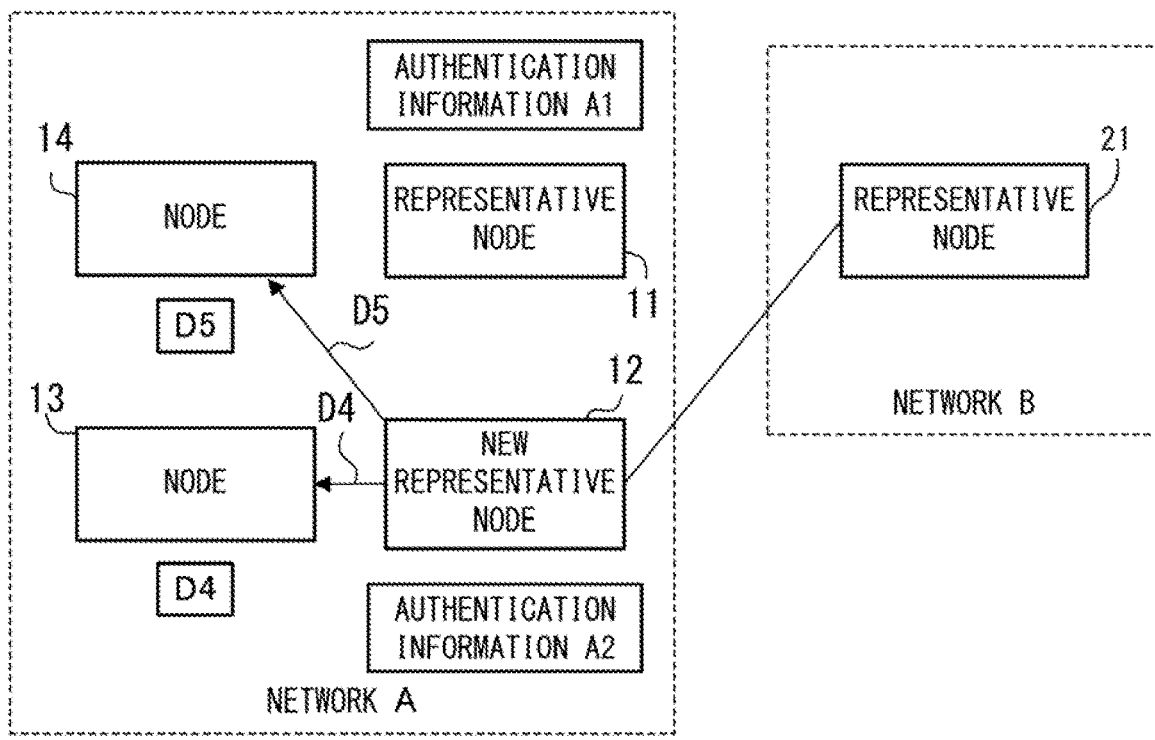
F I G. 5 B

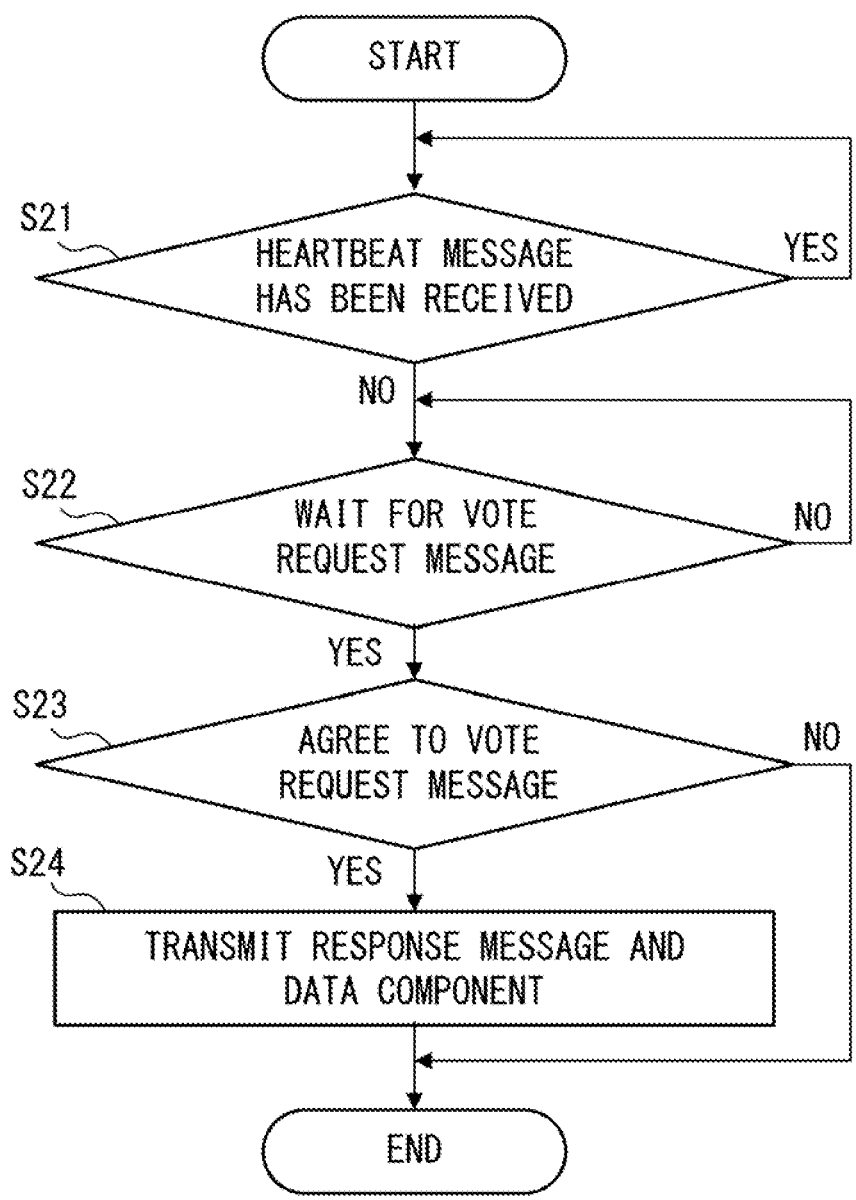
F I G. 10

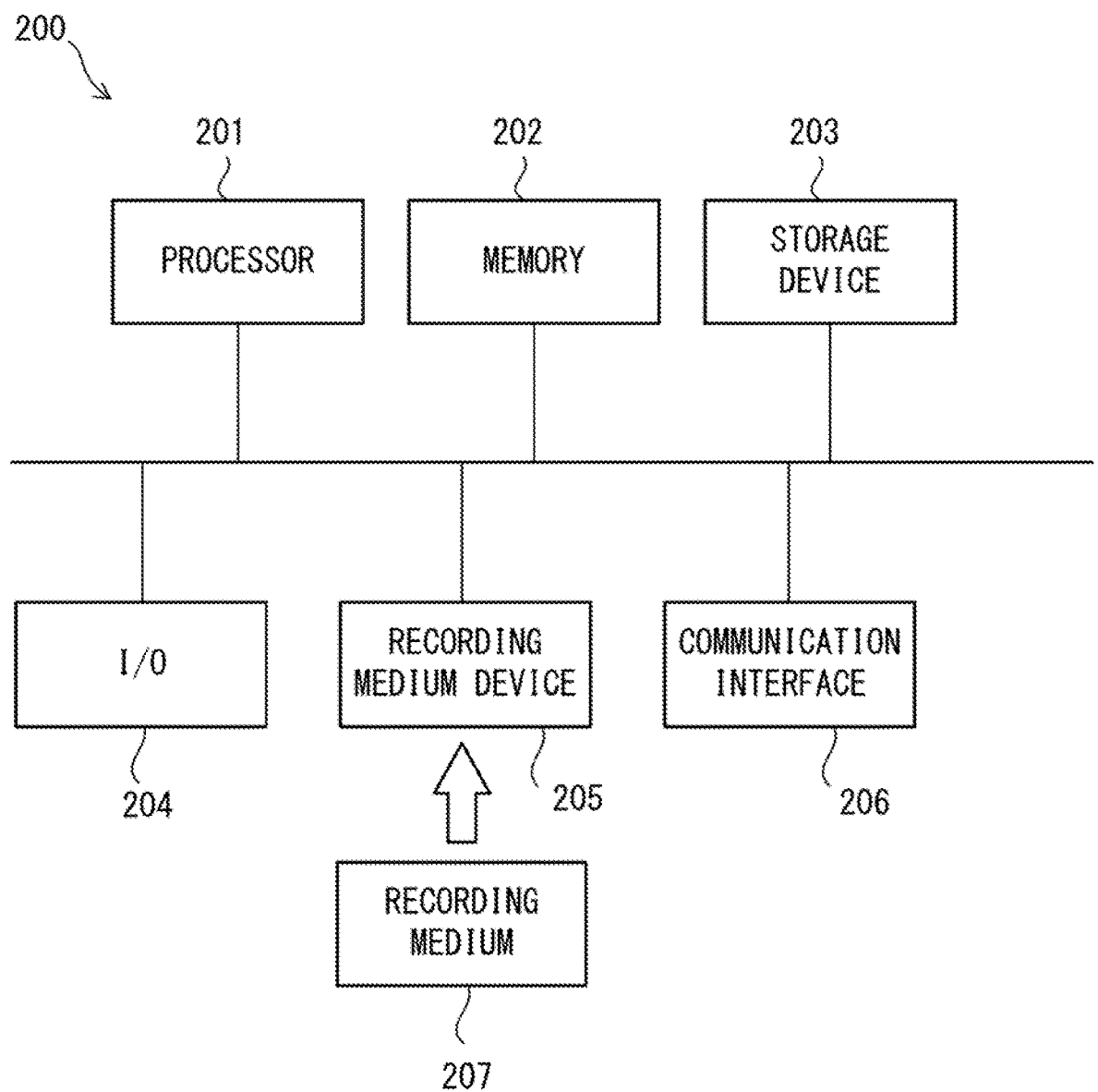
F I G. 1 2

<USER REGISTRATION TABLE UA1>

| CORRESPONDENT USER ID | RECEPTION PASSWORD |
|---|---|
| REPRESENTATIVE B | pwd_B1 |

<ACCESS INFORMATION TABLE DA1>

| NETWORK ID | REPRESENTATIVE NODE ADDRESS | REPRESENTATIVE ID | DESTINATION PASSWORD |
|---|---|---|---|
| NW_B | 192.168.2.1:80 | REPRESENTATIVE A | pwd_A1 |

FIG. 14A

<USER REGISTRATION TABLE UB1>

| CORRESPONDENT USER ID | RECEPTION PASSWORD |
|---|---|
| REPRESENTATIVE A | pwd_A1 |

<ACCESS INFORMATION TABLE DB1>

| NETWORK ID | REPRESENTATIVE NODE ADDRESS | REPRESENTATIVE ID | DESTINATION PASSWORD |
|---|---|---|---|
| NW_A | 192.168.1.1:80 | REPRESENTATIVE B | pwd_B1 |

FIG. 14B

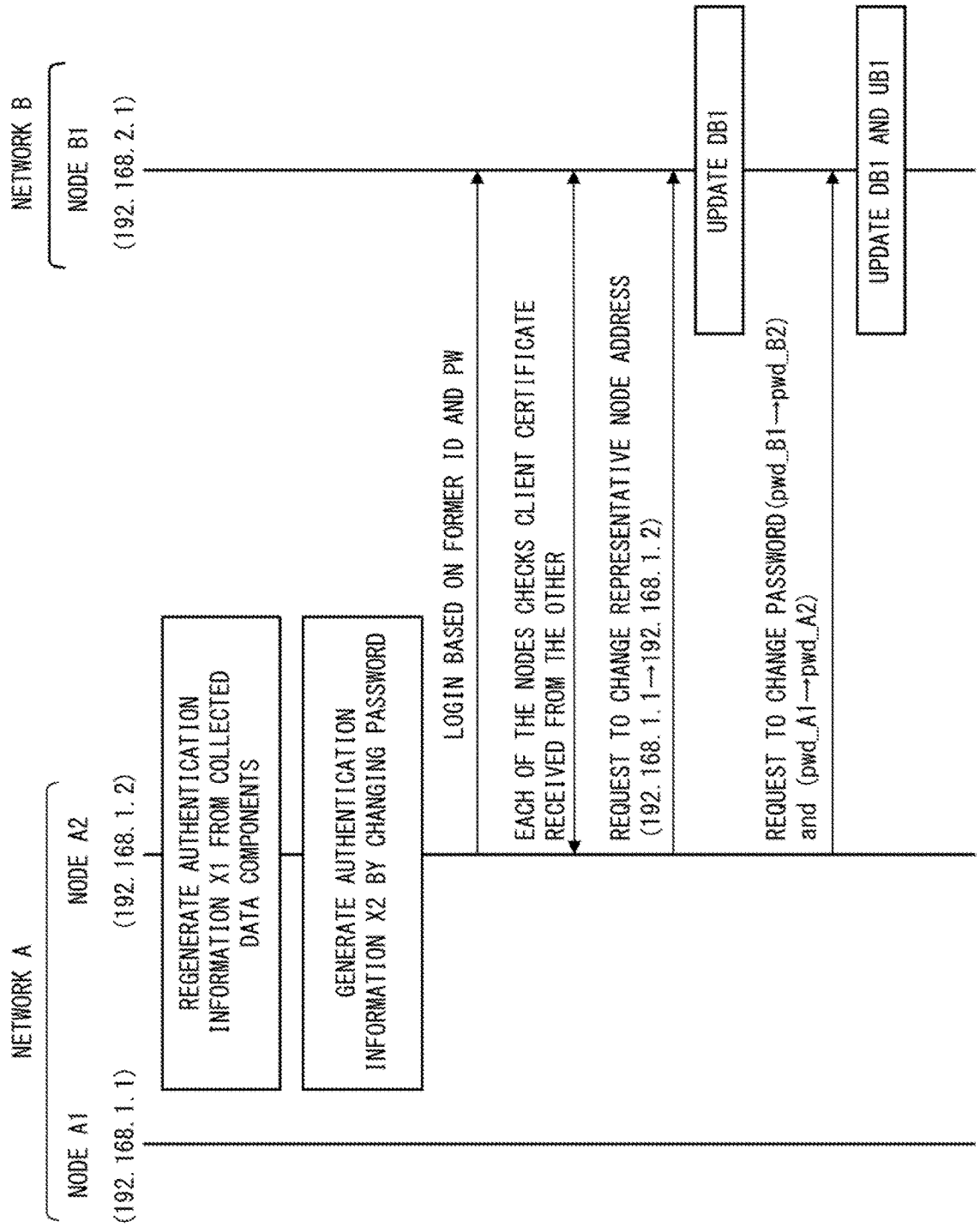
F I G. 15

<USER REGISTRATION TABLE UA2>

| CORRESPONDENT USER ID | RECEPTION PASSWORD |
|---|---|
| REPRESENTATIVE B | pwd_B1 ⇩ pwd_B2 |

<ACCESS INFORMATION TABLE DA2>

| NETWORK ID | REPRESENTATIVE NODE ADDRESS | REPRESENTATIVE ID | DESTINATION PASSWORD |
|---|---|---|---|
| NW_B | 192.168.2.1:80 | REPRESENTATIVE A | pwd_A1 ⇩ pwd_A2 |

FIG. 16A

<USER REGISTRATION TABLE UB1>

| CORRESPONDENT USER ID | RECEPTION PASSWORD |
|---|---|
| REPRESENTATIVE A | pwd_A1 ⇩ pwd_A2 |

<ACCESS INFORMATION TABLE DB1>

| NETWORK ID | REPRESENTATIVE NODE ADDRESS | REPRESENTATIVE ID | DESTINATION PASSWORD |
|---|---|---|---|
| NW_A | 192.168.1.1:80 ⇩ 192.168.1.2:80 | REPRESENTATIVE B | pwd_B1 ⇩ pwd_B2 |

| CORRESPONDENT USER ID | RECEPTION PASSWORD |
|---|---|
| REPRESENTATIVE B | pwd_BA1 |
| REPRESENTATIVE C | pwd_CA1 |

<DA1>

| NETWORK ID | REPRESENTATIVE NODE ADDRESS | REPRESENTATIVE ID | DESTINATION PASSWORD |
|---|---|---|---|
| NW_B | 192.168.2.1:80 | REPRESENTATIVE A | pwd_AB1 |
| NW_C | 192.168.3.1:80 | REPRESENTATIVE A | pwd_AC1 |

| CORRESPONDENT USER ID | RECEPTION PASSWORD |
|---|---|
| REPRESENTATIVE A | pwd_AB1 |
| REPRESENTATIVE C | pwd_CB1 |

<DB1>

| NETWORK ID | REPRESENTATIVE NODE ADDRESS | REPRESENTATIVE ID | DESTINATION PASSWORD |
|---|---|---|---|
| NW_A | 192.168.1.21:80 | REPRESENTATIVE B | pwd_BA1 |
| NW_C | 192.168.3.2:80 | REPRESENTATIVE B | pwd_BC1 |

| CORRESPONDENT USER ID | RECEPTION PASSWORD |
|---|---|
| REPRESENTATIVE A | pwd_AC1 |
| REPRESENTATIVE B | pwd_BC1 |

<DC1>

| NETWORK ID | REPRESENTATIVE NODE ADDRESS | REPRESENTATIVE ID | DESTINATION PASSWORD |
|---|---|---|---|
| NW_A | 192.168.1.31:80 | REPRESENTATIVE C | pwd_CA1 |
| NW_B | 192.168.2.3:80 | REPRESENTATIVE C | pwd_CB1 |

| CORRESPONDENT USER ID | RECEPTION PASSWORD |
|---|---|
| REPRESENTATIVE B | pwd_BA2★ |
| REPRESENTATIVE C | pwd_CA2★ |

<DA2>

| NETWORK ID | REPRESENTATIVE NODE ADDRESS | REPRESENTATIVE ID | DESTINATION PASSWORD |
|---|---|---|---|
| NW_B | 192.168.2.1:80 | REPRESENTATIVE A | pwd_AB2★ |
| NW_C | 192.168.3.1:80 | REPRESENTATIVE A | pwd_AC2★ |

| CORRESPONDENT USER ID | RECEPTION PASSWORD |
|---|---|
| REPRESENTATIVE A | pwd_AB2★ |
| REPRESENTATIVE C | pwd_CB1 |

<DB1>

| NETWORK ID | REPRESENTATIVE NODE ADDRESS | REPRESENTATIVE ID | DESTINATION PASSWORD |
|---|---|---|---|
| NW_A | 192.168.1.22:80★ | REPRESENTATIVE B | pwd_BA2★ |
| NW_C | 192.168.3.2:80 | REPRESENTATIVE B | pwd_BC1 |

| CORRESPONDENT USER ID | RECEPTION PASSWORD |
|---|---|
| 代表A | pwd_AC2★ |
| 代表B | pwd_BC1 |

<DC1>

| NETWORK ID | REPRESENTATIVE NODE ADDRESS | REPRESENTATIVE ID | DESTINATION PASSWORD |
|---|---|---|---|
| NW_A | 192.168.1.32:80★ | REPRESENTATIVE C | pwd_CA2★ |
| NW_B | 192.168.2.3:80 | REPRESENTATIVE C | pwd_CB1 |

FIG. 20C

COMMUNICATION DEVICE AND COMMUNICATION METHOD FOR PROCESSING AUTHENTICATION INFORMATION

CROSS-REFERENCE TO RELATED APPLICATIONS

This application is based upon and claims the benefit of priority of the prior Japanese Patent Application No. 2018-237855, filed on Dec. 20, 2018, the entire contents of which are incorporated herein by reference.

FIELD

The embodiments discussed herein are related to a communication device and a communication method for processing authentication information.

BACKGROUND

Techniques for mutually connecting a plurality of networks have been in widespread use. For example, networks implemented at a plurality of locations within one company may be mutually connected. Alternatively, networks operated by a plurality of companies may be mutually connected. Border Gateway Protocol (BGP) is known as an Internet Protocol (IP) for mutually connecting networks.

When a plurality of networks are mutually connected, a representative node is selected in each of the networks. The representative node is operated as a gateway. Accordingly, each network communicates with the other networks via the representative node. The representative node holds authentication information for performing communications with the other networks. The representative node connects to the other networks by using the authentication information.

In the meantime, data distribution networks that provide services for allowing sales and purchases of data have started to become widespread. In a data distribution network, data owned by an organization or a person is used by other organizations or persons. Hence, participants in the data distribution network may provide a market with data that they own. In addition, the participants may use data provided to the market. In many cases, data distribution networks are implemented by mutually connecting a plurality of networks.

Attention has been focused on a block chain technique for managing data while preventing falsification in a decentralized environment where an administrator is not present. The block chain technique is such that a plurality of participants or all participants inspect transactions so as to provide a distribution registry that cannot be by falsified. The block chain technique can contribute to improvement of the security of data distribution networks.

A proposed method is one wherein a plurality of pieces of partial data generated from important data through a secret sharing technique are stored in a distributed manner in a plurality of data centers so as to prevent the partial data from being illicitly acquired between the data centers (e.g., Japanese Laid-open Patent Publication No. 2013-020313). A proposed system is one for managing objects in a clustered network (e.g., Japanese National Publication of International Patent Application No. 2005-502957).

In a communication system in which a plurality of networks are mutually connected via representative nodes, when a fault occurs in a representative node in a certain network, another node in this network is selected as a new representative node. The new representative node performs processing for connecting to the representative nodes in the other networks. In this case, the new representative node performs authentication processes with the representative nodes in the other networks by using the same authentication information as the former representative node. Hence, in order to allow recovery from a fault by using this method, the same authentication information needs to be held by a plurality of or all nodes in each network.

However, when a plurality of or all nodes in each network hold the sane authentication information, even a node that is not selected as a representative node may communicate with another network. If a malicious user seizes one node in a network, all nodes in the network could be impaired. Accordingly, the prior art does not provide sufficient network security.

SUMMARY

According to an aspect of the embodiments, a communication device among a plurality of communication devices that are used in a first network includes a processor. The processor monitors a first message that is periodically transmitted from a representative device that is selected from the plurality of communication devices. The processor transmits a second message to the communication devices in the first network when the first message is not detected for a specified period of time. When two or more data components obtained by dividing authentication information for connection to a second network have been distributed from the representative device to two or more of the communication devices in the first network, the processor receives data components transmitted from the communication devices in the first network in response to the second message. When a specified number of data components or more are received, the processor regenerates the authentication information from the specified number of data components or more. The processor generates new authentication information by rewriting at least a portion of the regenerated authentication information. The processor connects to the second network based on the new authentication information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A, 2B, 3A, 3B, 4A, 4B, 5A, 5B, and 6 illustrate an example of switching a representative node;

FIG. 10 is a flowchart indicating another example of processing performed by an ordinary node;

FIG. 12 illustrates an example of the hardware configuration of a computer operated as a communication device;

FIGS. 14A and 14B illustrate examples of authentication information before update;

FIG. 15 illustrates an example of a sequence of switching a representative node in a first example;

FIGS. 16A and 16B illustrate examples of authentication information after update;

FIGS. 18A-18C illustrate examples of authentication information before update;

FIGS. 20A-20C illustrate examples of authentication information after update;

DESCRIPTION OF EMBODIMENTS

Figure 1:
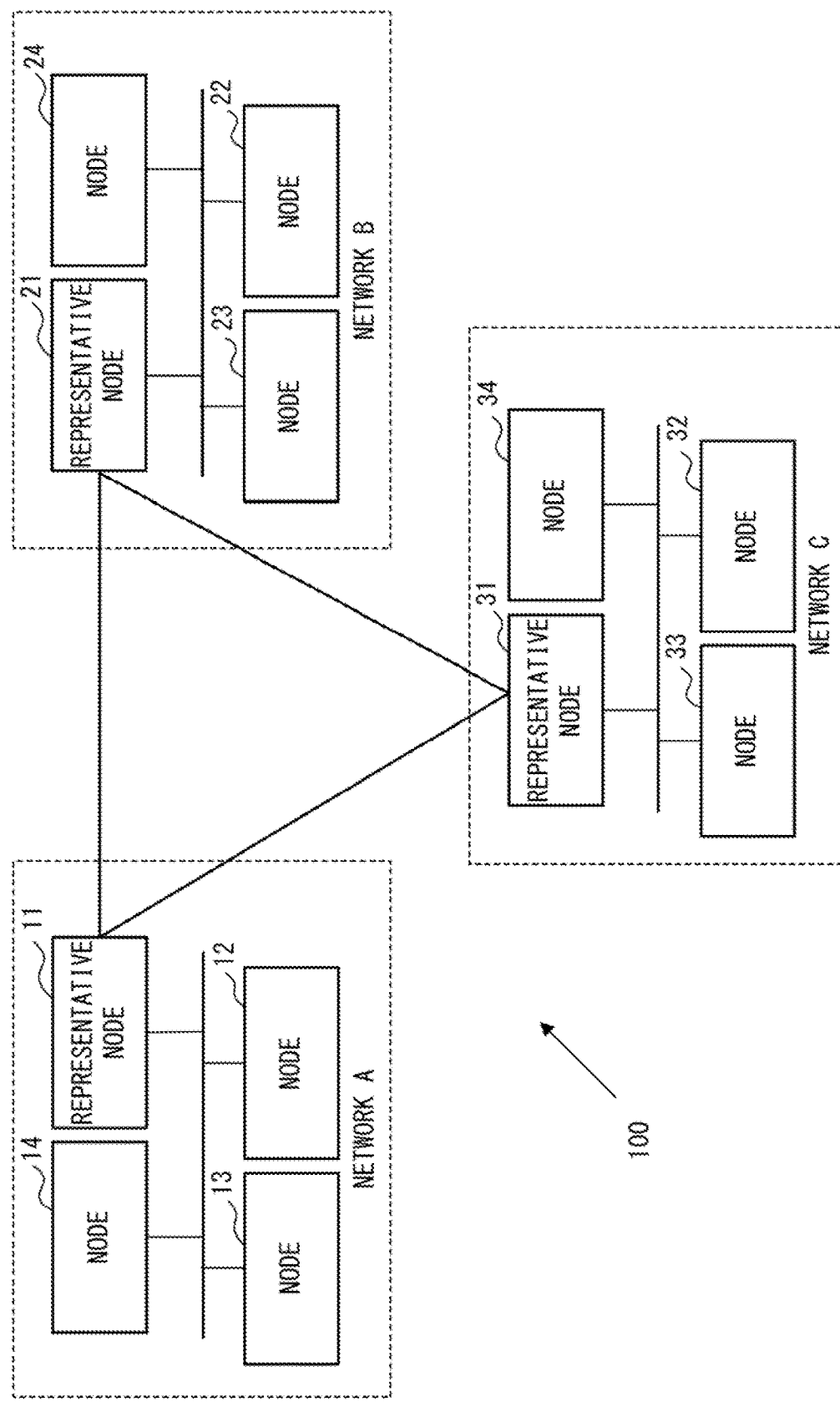
FIG. 1 illustrates an example of a communication system in accordance with embodiments of the present invention.

FIG. 1 illustrates an example of a communication system in accordance with embodiments of the present invention. A communication system 100 in accordance with embodiments of the invention includes a plurality of mutually connected networks. In the example depicted in FIG. 1, networks A-C are mutually connected. For example, the networks A-C may be operated by different companies.

Each of the networks A-C includes a plurality of nodes. A communication device is implemented in each node. The communication device implemented in each node is not particularly limited but may be, for example, a router. A communication device implemented in a node may hereinafter be referred to as a "node".

One or more computers may be connected to each node. For example, the computer connected to each node may be a user computer or a server computer.

In each of the networks A-C, a representative node to be operated as a gateway is selected from a plurality of nodes. In the example depicted in FIG. 1, a node 11 is selected as a representative node from a plurality of nodes 11-14 in the network A. Similarly, a node 21 is selected as a representative node in the network B, and a node 31 is selected as a representative node in the network C. A node or communication device selected as a representative node may hereinafter be referred to as a "representative node" or a "representative device".

The networks A-C are mutually connected via the representative nodes. Accordingly, the networks A and B are mutually connected through a communication between the representative nodes 11 and 21. Similarly, the networks A and C are mutually connected through a communication between the representative nodes 11 and 31, and the networks B and C are mutually connected through a communication between the representative nodes 21 and 31.

When a fault occurs in a representative node in the communication system 100, a network that includes this representative node cannot communicate with the other networks. Accordingly, when a fault occurs in a representative node in a certain network, a new representative node will be selected in this network. For example, when a fault occurs in the representative node 11 in the network A, one of the nodes 12-14 may be selected as a new representative node. Then, the connections between the networks will be reestablished through communications between the new representative node and the representative nodes of the other networks.

Reliability needs to be established between a plurality of networks so as to securely connect these networks. Accordingly, mutual authentication is performed between representative nodes operated as gateways, and network communications are allowed only for pairs of gateways successfully authenticated.

FIGS. 2A, 2B, 3A, 3B, 4A, 4B, 5A, 5B, and 6 illustrate an example of switching a representative node. In this example, networks A and B are mutually connected. A node 11 is operated as a representative node in the network A, and a node 21 is operated as a representative node in the network B. The network A includes nodes 12-14 in addition to the representative node 11.

The representative node 11 holds authentication information A1, as depicted in FIG. 2A. Authentication information A is used to establish a connection between the networks A and B. For example, authentication information A1 may include an ID for identifying the network, the address of the representative node, and a password for the communication between the networks A and B. The representative node 11 performs an authentication process with the representative node 21 by using authentication information A1. The representative nodes 11 and 21 perform the authentication process in cooperation with each other. As a result, the networks A and B are mutually connected.

Although not illustrated in any of FIGS. 2A, 2B, 3A, 3B, 4A, 4B, 5A, 5B, and 6, each of the nodes 11-14 holds a client certificate. The client certificates held by the nodes 11-14 will preferably be different from each other.

As depicted in FIG. 2B, the representative node 11 divides authentication information A1 into a plurality of data components. For example, the number of data components generated by dividing authentication information A may depend on the number of nodes in the network A. As an example, the number of data components may be equal to the number of nodes excluding the representative node. In the example depicted in FIGS. 2A, 2B, 3A, 3B, 4A, 4B, 5A, and 6, the network A includes four nodes. Hence, the number of nodes in the network A excluding the representative node is three. Thus, three data components are generated from authentication information A1. In this case, each of the nodes (12, 13, 14) excluding the representative node is given a single data component.

Figure 7:
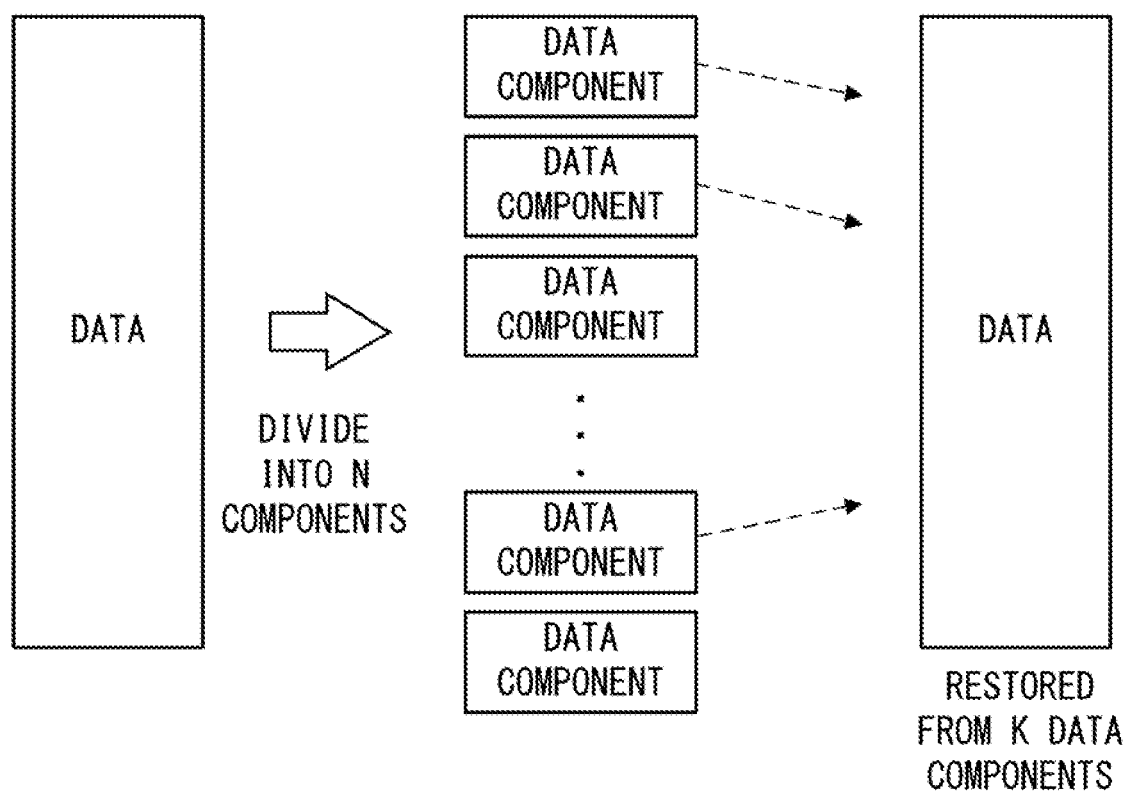
FIG. 7 illustrates Shamir's secret sharing method.

For example, the representative node 11 may divide authentication information A1 into a plurality of data components by using Shamir's secret sharing method. In Shamir's secret sharing method, input data is divided into N (N is an integer that is 2 or larger) data components, as depicted in FIG. 7. The data components are generated in a manner such that the details of the input data cannot be determined from each of the data components. A decoder device can regenerate the input data from K (K is an integer lower than or equal to N) data components among the N data components. Values may be set for N and K in advance. For example, the value of N may depend on the number of nodes in the network. The values of N and K may depend on the importance of data. In this case, N and K may be large values when the data is important.

In the example depicted in FIGS. 2A, 2B, 3A, 3B, 4A, 4B, 5A, 5B, and 6, N is 3 and K is 2. Thus, the representative node 11 generates data components D1-D3 by dividing authentication information A1. The representative node 11 transmits the data components D1, D2, and D3 to nodes 12, 13, and 14, respectively. Accordingly, the nodes 12, 13, and 14 respectively store the received data components D1, D2, and D3 in local storages.

The representative node 11 may divide authentication information A1 into N data components by using a method different from Shamir's secret sharing method. However, the data components are generated preferably in a manner such that the details of the original data cannot be determined from each of the data components. It is preferable that the original data can be regenerated from K data components of the N data components.

Figure 3A:
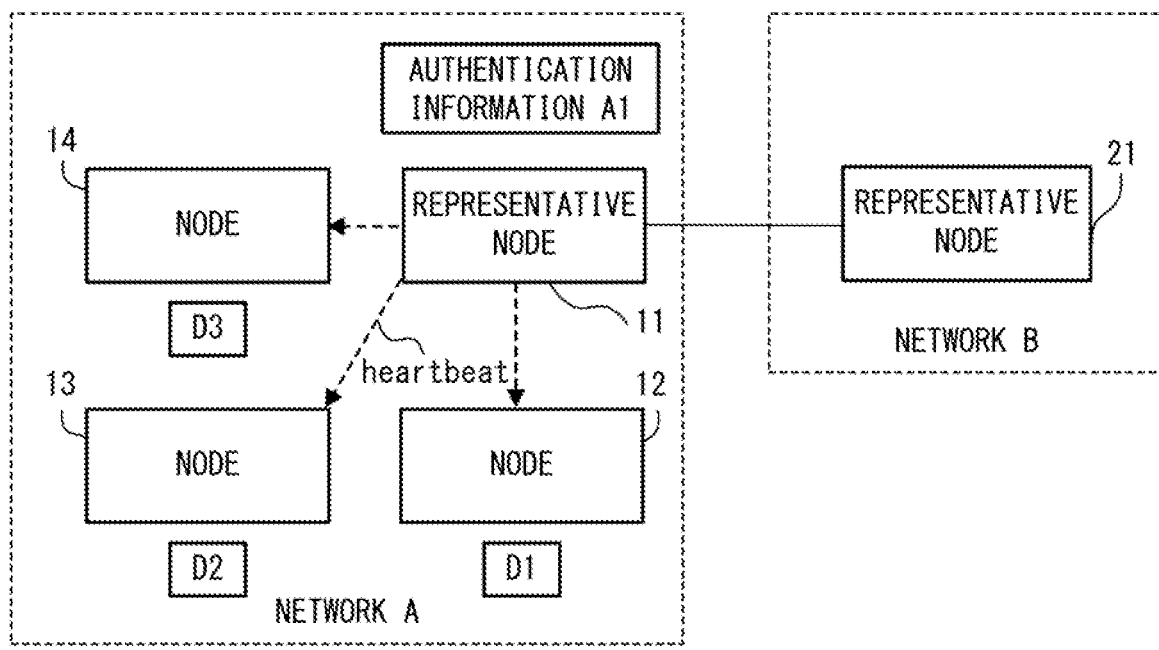

As depicted in FIG. 3A, the representative node 11 periodically transmits a heartbeat message to each node in the network A. The heartbeat message is an example of a life-or-death confirmation message or a presence confirmation message. The heartbeat message includes information for identifying the source of this message. Accordingly, when the heartbeat message is periodically received, each of the nodes 12-14 decides that the representative node 11 is being operated normally.

Figure 3B:
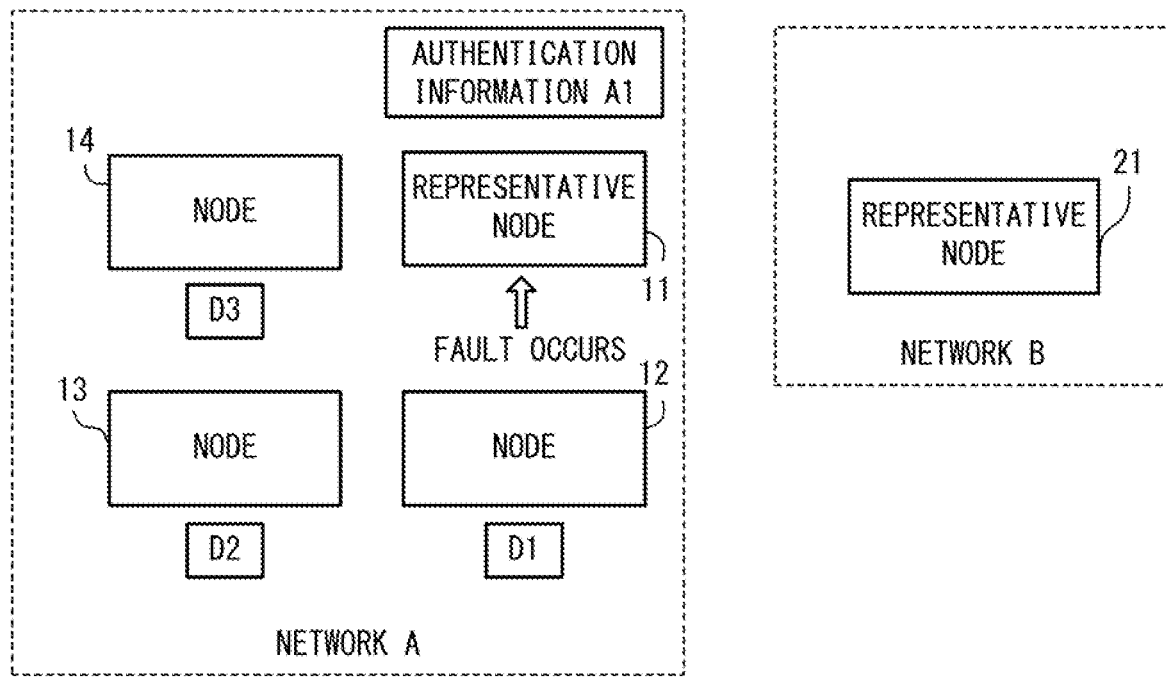

Assume that a fault has occurred in the representative node 11, as depicted in FIG. 3B. In this case, the nodes 12-14 do not receive a heartbeat message for a specified duration or longer. Accordingly, each of the nodes 12-14 decides that a fault has occurred in the representative node 11. The "specified duration" is longer than a transmission cycle of the heartbeat message. When a fault occurs in the representative node 11, the connection between the networks A and B will be terminated.

When a fault occurs in the representative node 11, another node in the network A needs to be operated as a new representative node. In this example, a new representative node is selected in accordance with an algorithm called Raft.

Figure 4A:
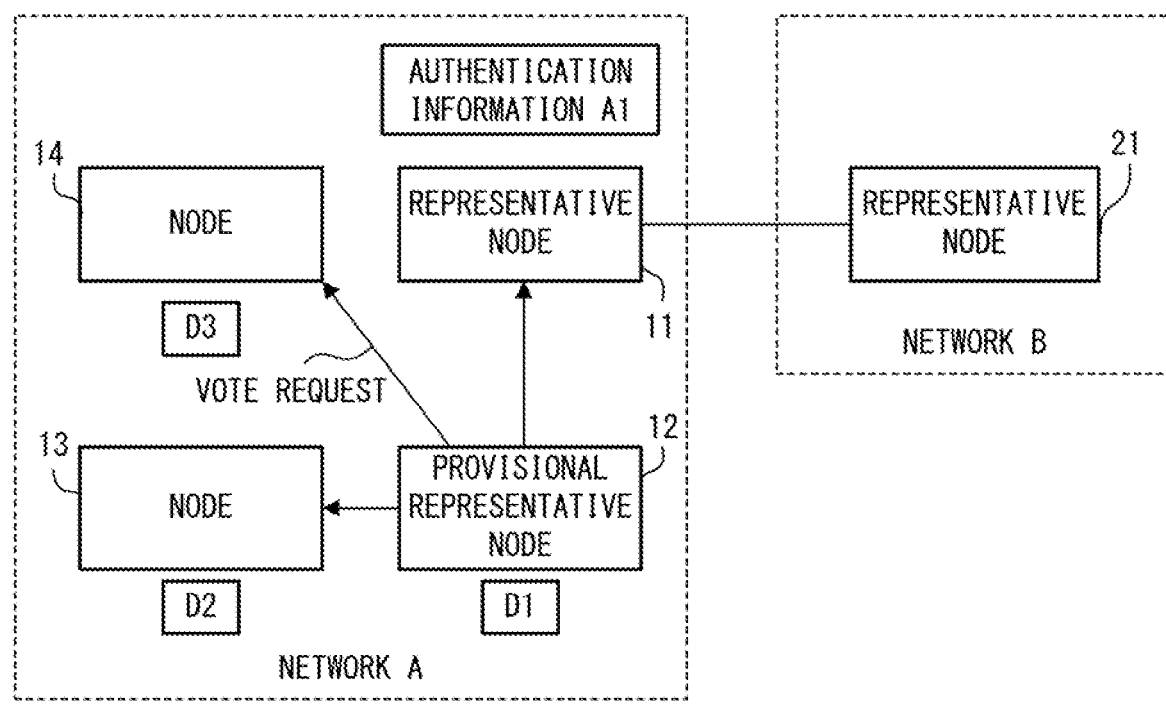

In this case, a node that has an ability to be operated as a representative node runs as a candidate for the new representative node. In this example, the node 12 runs as a candidate for the new representative node, as depicted in FIG. 4A. A node that runs as a candidate for a new representative node may hereinafter be referred to as a "provisional representative node".

The provisional representative node 12 transmits a vote request message to each node in the network A. In this case, the vote request message indicates that the node 12 is running as a candidate for the new representative node.

Figure 4B:
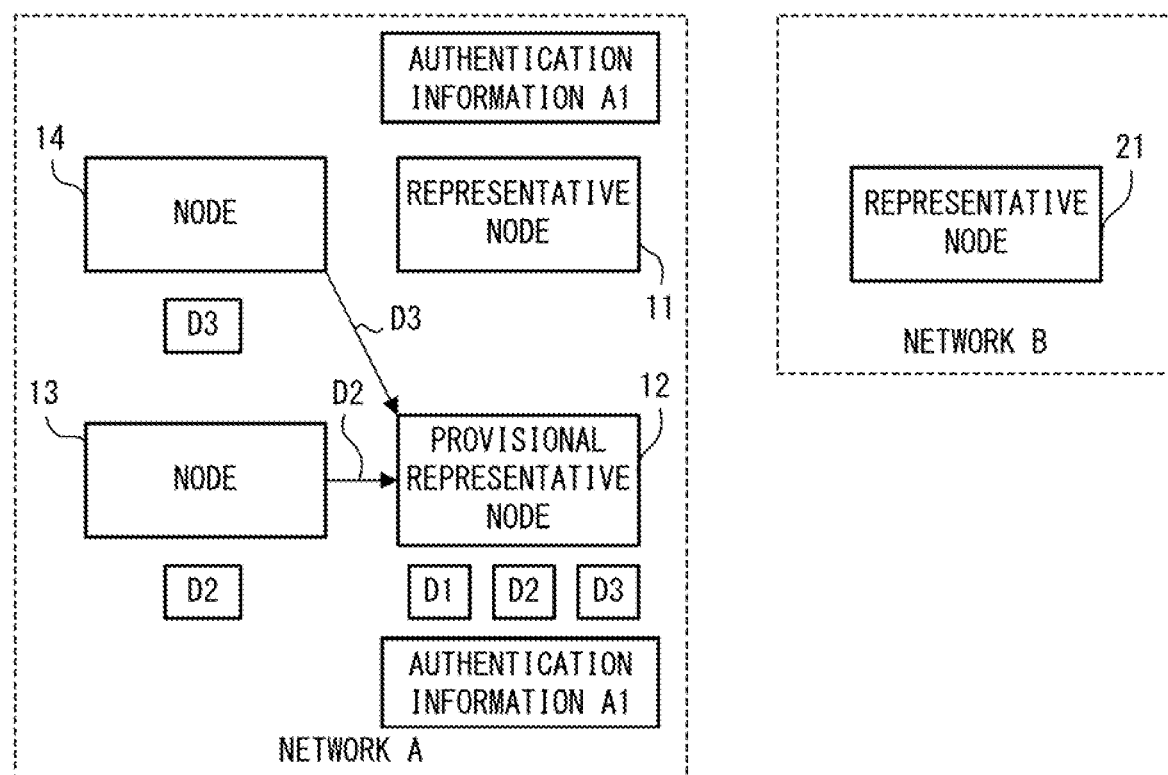

Upon receipt of the vote request message from the provisional representative node 12, each of the nodes 13 and 14 decides whether to agree that the node 12 will be operated as a new representative node. When agreeing that the node 12 will be operated as a new representative node, each of the nodes 13 and 14 transmits a response message to the provisional representative node 12. In this case, as depicted in FIG. 4B, each of the nodes 13 and 14 transmits its own data component to the provisional representative node 12 together with the response message. In particular, the node 13 transmits the data component D2 to the provisional representative node 12, and the node 14 transmits the data component D3 to the provisional representative node 12.

The vote request message transmitted from the provisional representative node 12 also arrives at the representative node 11. However, a fault has occurred in the representative node 11. Hence, in this example, the representative node 11 does not transmit a response message to the provisional representative node 12.

When response messages have been received from a specified number of nodes in the network A, the provisional representative node 12 decides that an agreement has been established in the network A for the provisional representative node 12 to be operated as a new representative node for the network A. For example, when response messages have been received from more than fifty percent of the nodes in the network A, the provisional representative node 12 may decide that the agreement has been established in the network A. Upon the agreement being established, the provisional representative node 12 starts to be operated as a "new representative node".

The new representative node 12 regenerates authentication information A1 by using data components received from other nodes in the network A. In this example, the provisional representative node 12 regenerates authentication information A1 from the data component D1 owned by the provisional representative node 12, the data component D2 received from the node 13, and the data component D3 received from the node 14. Authentication information A1 has been divided into three data components by using Shamir's secret sharing method. Accordingly, when K=2, the provisional representative node 12 may regenerate authentication information A1 from two of the data components D1-D3. When K=3, the provisional representative node 12 may regenerate authentication information A1 from the data components D1-D3.

The provisional representative node 12 may use another method to decide whether an agreement has been reached for the provisional representative node 12 to be operated as a new representative node for the network A. For example, when authentication information A1 is regenerated from acquired data components, the provisional representative node 12 may decide that an agreement has been established for the provisional representative node 12 to be operated as a new representative node for the network A.

As depicted in FIG. 5A, the new representative node 12 generates authentication information A2 by updating the regenerated authentication information A1. Assume that authentication information A1 includes the address of the representative node 11 and a password used in a communication between the representative nodes 11 and 21. In this case, the new representative node 12 may generate authentication information A2 by, for example, replacing the address of the representative node 11 with the address of the new representative node 12. In addition, the new representative node 12 may substitute the password included in authentication information A1 with a password to be used in a communication between the representative nodes 12 and 21. Then, the new representative node 12 performs an authentication process with the representative node 21 according to authentication information A2. In this case, the new representative node 12 and the representative node 21 perform the authentication process in cooperation with each other. As a result, the networks A and B are mutually reconnected.

After the networks A and B are connected according to authentication information A2, the networks A and B cannot be connected using authentication information A1. In particular, authentication information A1 is substantially invalidated. Accordingly, security is ensured for the communication between the networks A and B.

Subsequently, as depicted in FIG. 5B, the new representative node 12 generates a plurality of data components by dividing authentication information A2. In this case, for example, the new representative node 12 may generate a plurality of data components by dividing authentication information A2 by using Shamir's secret sharing method. The plurality of data components are respectively distributed to a different node of the plurality of nodes in the network A.

Figure 6:
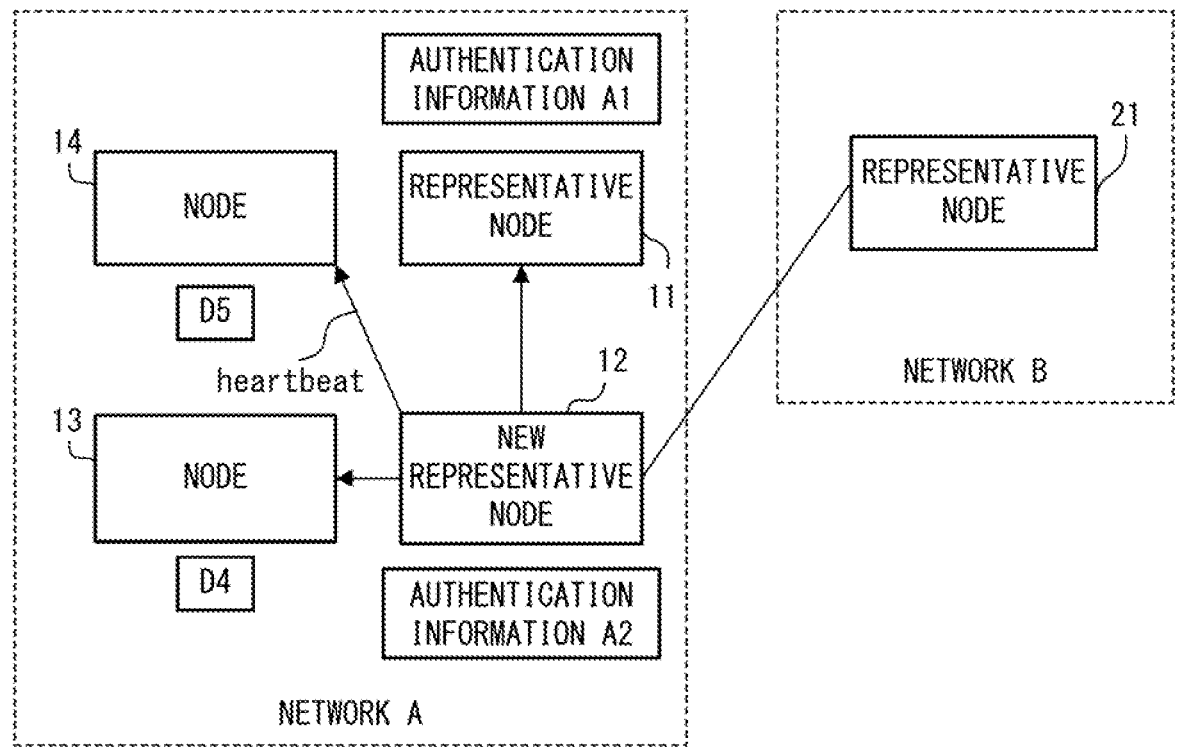

As depicted in FIG. 6, the new representative node 12 periodically transmits a heartbeat message to each node in the network A. By monitoring the heartbeat message, each of the nodes 13 and 14 may detect whether the new representative node 12 is being operated normally.

As described above, authentication information that is used to allow a representative node to communicate with the representative node of another network is divided into a plurality of data components and distributed to a plurality of nodes in the network. The data components are generated in a manner such that the details of the authentication information cannot be recognized from the each of the data components. Accordingly, a node that has not been selected as a representative node cannot communicate with another network. In addition, if a malicious user seizes one node in a network, this node cannot communicate with another network. Hence, negative influence on other nodes in the network or on other networks will be reduced.

In addition, a node that runs as a candidate for a new representative node (provisional representative node) may be operated as a representative node when an agreement is established by a specified number of nodes or more. When data components are acquired from a specified number of nodes or more, the representative node regenerates and updates authentication information and communicates with another network by using the updated authentication information. Accordingly, network reconnection is achieved when an agreement is established by a plurality of nodes (e.g., more than fifty percent of the nodes) in a network. Hence, network security can be improved in a decentralized environment where an administrator is not present.

In the example described above, a representative node is switched due to a fault occurring in this node. However, the present invention is not limited to this sequence. For example, when a communication device operated as a representative node undergoes maintenance, the network administrator may stop the heartbeat of this communication device. In this case, a new representative node is autonomously selected in accordance with the stopping of the heartbeat, and the mutual connections between networks continue.

Figure 8:
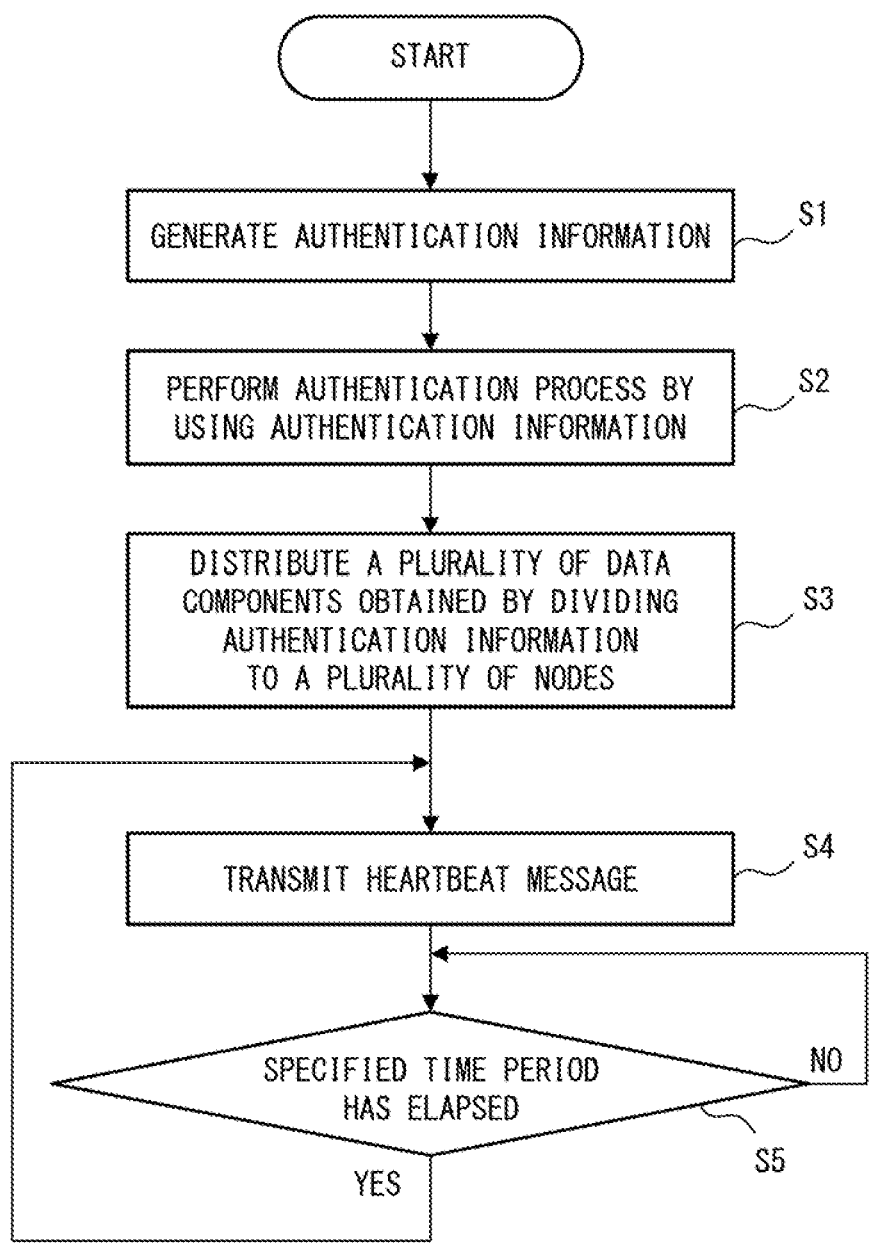
FIG. 8 is a flowchart indicating an example of processing performed by a representative node.

FIG. 8 is a flowchart indicating an example of processing performed by a representative node. The processes of this flowchart are performed by a communication device selected as a representative node.

In S1, the representative node generates authentication information. The process of generating authentication information in S1 includes a process of updating authentication information. Accordingly, S2-S5 are performed when the representative node generates or updates authentication information.

In S2, the representative node performs an authentication process with the representative node of another network according to the authentication information. In S3, the representative node distributes a plurality of data components obtained by dividing the authentication information to a plurality of nodes in the network. For example, the authentication information may be divided into a plurality of data components by using Shamir's secret sharing method. In S4-S5, the representative node repeatedly transmits a heartbeat message to each node in the network at specified time intervals. In addition to performing the processes of S1-S5, the representative node serves as a gateway to communicate with the other network.

Figure 9:
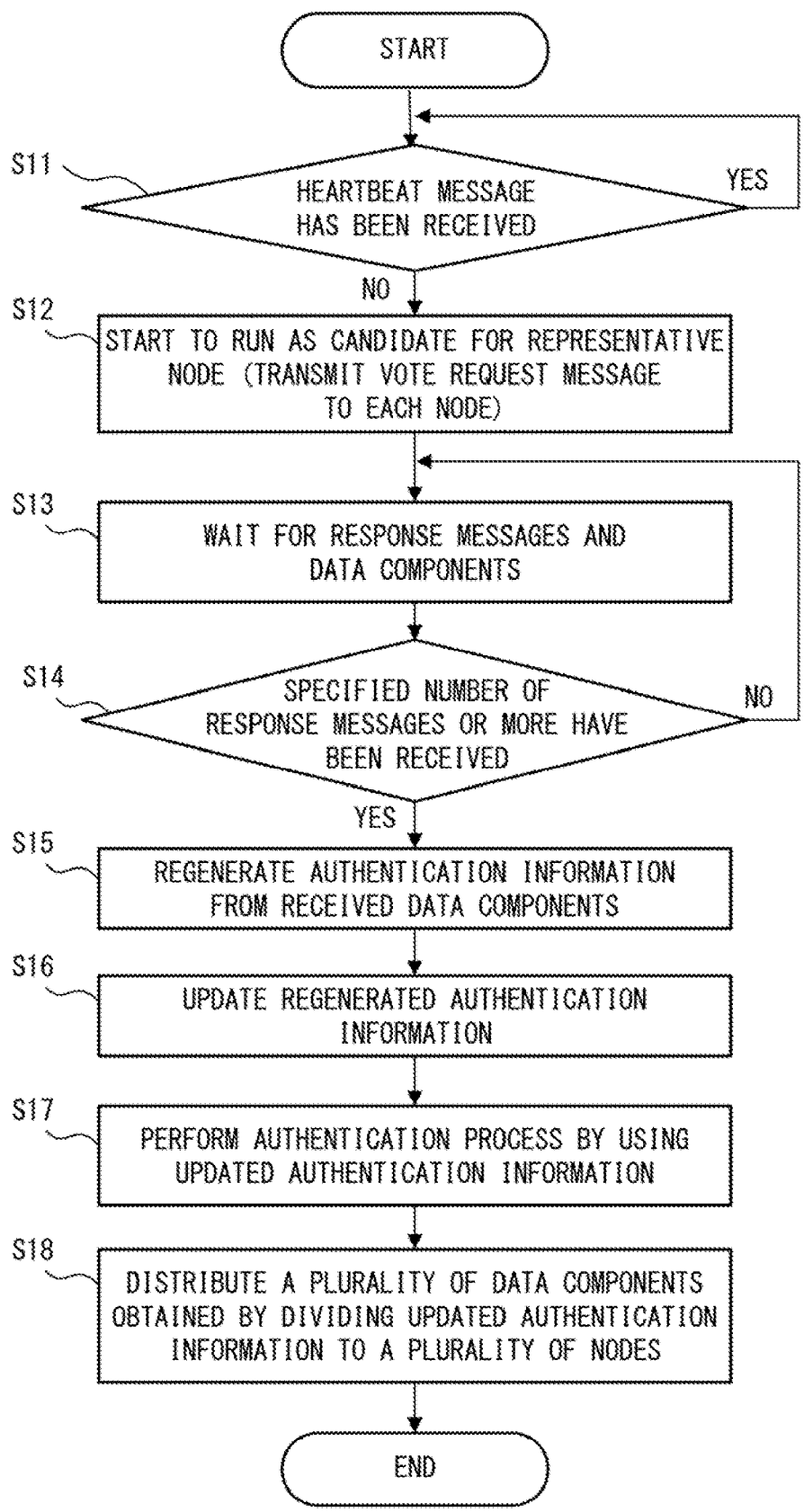
FIG. 9 is a flowchart indicating an example of processing performed by an ordinary node.

FIG. 9 is a flowchart indicating an example of processing performed by an ordinary node. The processes of this flowchart are performed by a communication device implemented in an ordinary node. In this example, an ordinary node refers to a node that is not being operated as a representative node.

In S11, a communication device monitors a heartbeat message transmitted from a representative node. When the representative node is operated normally, the representative node periodically transmits a heartbeat message to each node in the network, as depicted in FIGS. 3A and 8. When a heartbeat message is not received, the process of the communication device shifts to S12.

In S12, the communication device starts to run as a candidate for a representative node. Accordingly, the communication device transmits a vote request message to each node in the network. The communication device runs as a candidate for a representative node when this device has an ability to be operated as a representative node.

In S13-S14, the communication device waits for response messages and data components to be transmitted from other nodes. When a specified number of response messages or more are received, the communication device decides that an agreement has been established in the network for this communication device to be operated as a representative node. After the agreement is established, the communication device is operated as a new representative node. In this case, the process of the communication device shifts to S15.

For example, "a specified number" may be fifty percent of the total or more. However, "a specified number" is not limited to fifty percent of the total or more. When, for example, authentication information that has been divided into N data components can be regenerated from K data components of the N data components, the communication device may decide that the agreement has been established when K response messages or more have been received.

In S15, the communication device regenerates authentication information from the received data components. In S16, the communication device updates the regenerated authentication information. In this case, for example, the address and/or password in the authentication information may be updated. In S17, the communication device performs an authentication process based on the updated authentication information. In S18, a plurality of data components obtained by dividing the updated authentication information are distributed to a plurality of nodes in the network.

Then, the communication device serves as a gateway device to communicate with other networks. The communication device also repeatedly transmits a heartbeat message to each node in the network at specified time intervals. When a plurality of communication devices run as candidates for a new representative node due to a fault in a representative node, a communication device that is the first to have received a specified number of response messages or more may be operated as a representative node.

FIG. 10 is a flowchart indicating another example of processing performed by an ordinary node. For example, the processes of this flowchart may be performed by a communication device that does not have an ability to be operated as a representative node.

In S21, a communication device monitors heartbeat messages transmitted from a representative node. When a heartbeat message is not received, the process of the communication device shifts to step S22.

In S22, the communication device waits for a vote request message. A vote request message is transmitted from a communication device that has started to run as a candidate for a representative node. When a vote request message is received, the communication device decides in S23 whether to agree that the node that is the source of the vote request message will be operated as a representative node. For example, the communication device may decide whether to agree with the vote request message according to the ID or address of the node that is the source of the vote request message.

When agreeing with the vote request message, the communication device transmits, in S24, a response message to the node that is the source of the vote request message. In this case, the communication device also transmits, to the source node, data components of authentication information stored in a local storage in the node.

Figure 11:
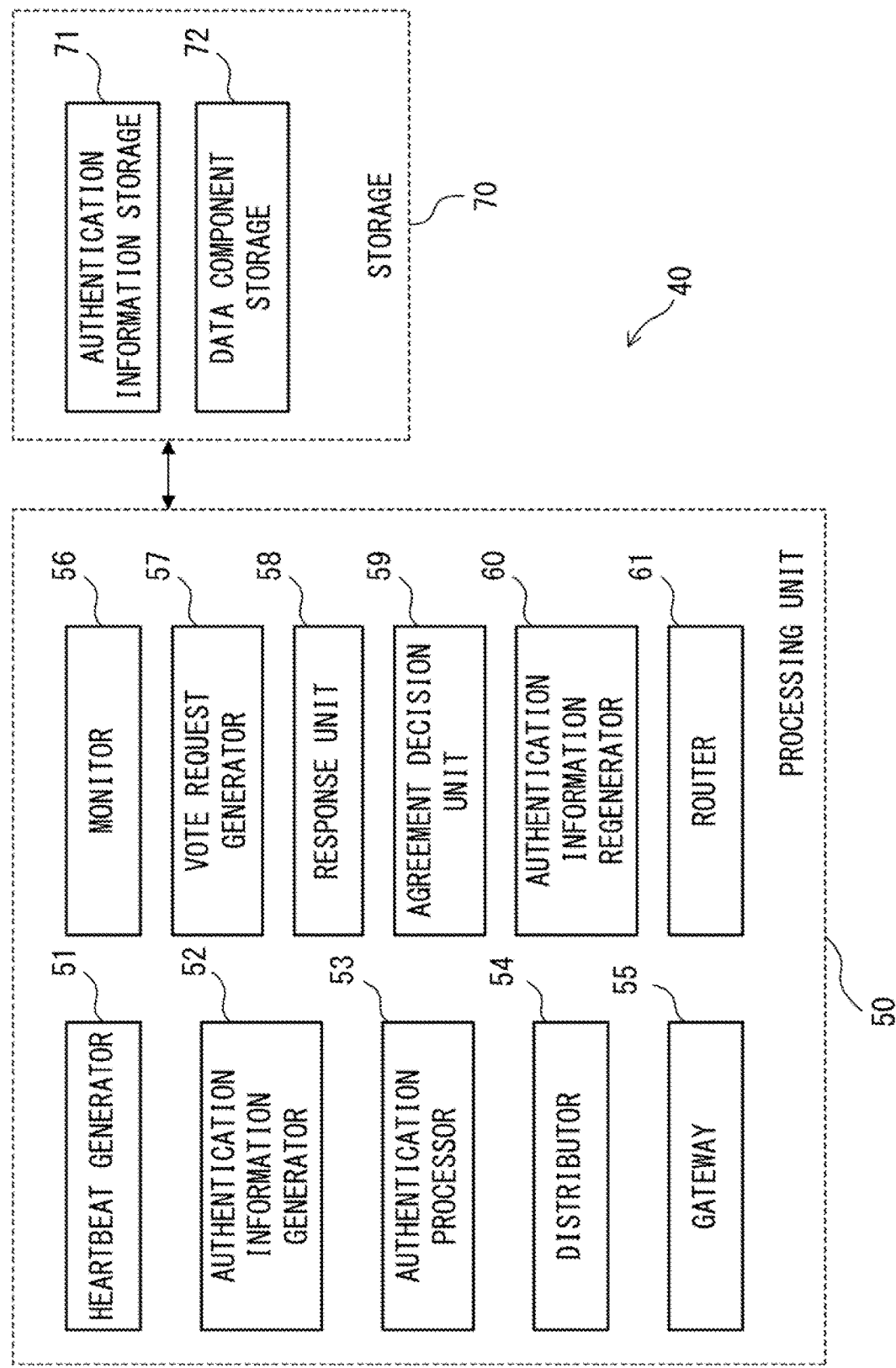
FIG. 11 illustrates an example of the functions of a communication device.

FIG. 11 illustrates an example of the functions of a communication device implemented in each node. A communication device 40 includes a processing unit 50 and a storage 70. The communication device 40 may include functions that are not depicted in FIG. 11.

The processing unit 50 includes a heartbeat generator 51, an authentication information generator 52, an authentication processor 53, a distributor 54, a gateway 55, a monitor 56, a vote request, generator 57, a response unit 58, an agreement decision unit 59, an authentication information regenerator 60, and a router 61. The processing unit 50 may include functions that are not depicted in FIG. 11.

The heartbeat generator 51 periodically generates and transmits a heartbeat message to nodes in the network. The authentication information generator 52 generates or updates authentication information. The authentication processor 53 performs an authentication process according to authentication information in cooperation with the representative node of another network. The distributor 54 generates two or more data components by dividing authentication information and distributes these data components to two or more nodes in the network. In this case, it is preferable that N data components be distributed to N different nodes. The gateway 55 functions as a gateway device. The heartbeat generator 51, the authentication information generator 52, the authentication processor 53, the distributor 54, and the gateway 55 are operated mainly when the communication device 40 is selected as a representative node.

The monitor 56 monitors heartbeat messages transmitted from a representative node. When the monitor 56 does not receive a heartbeat message for a specified duration or longer, the vote request generator 57 generates and transmits a vote request message to nodes in the network. When the communication device 40 receives a vote request message from another node, the response unit 58 transmits a response message to the node that is the source of the vote request message. When agreeing with a vote request message, the response unit 58 transmits a response message to the node that is the source of the vote request message. When the communication device 40 holds a data component, the response unit 58 transmits this data component together with a response message.

When the communication device 40 has received a specified number of response messages or more, the agreement decision unit 59 decides that an agreement has been established in the network for the communication device 40 to be operated as a representative node. When the agreement is established in the network, the authentication information regenerator 60 regenerates authentication information from data components received by the communication device 40 (and the data component held by the communication device 40). The router 61 functions as a router device. The monitor 56, the vote request generator 57, the response unit 58, the agreement decision unit 59, the authentication information regenerator 60, and the router 61 are operated mainly when the communication device 40 is not selected as a representative node.

The storage 70 includes an authentication information storage 71 and a data competent storage 72. The authentication information storage 71 stores authentication information generated or updated within the communication device 40. The data component storage 72 stores data components received from a representative node. The storage 70 may store data or information that is not depicted in FIG. 11. When detecting that a new representative node has been selected in the network, the communication device 40 preferably discards the authentication information stored in the authentication information storage 71 and the data components stored in the data component storage 72.

FIG. 12 illustrates an example of the hardware configuration of a computer operated as a communication device 40 implemented in each rode. A computer 200 includes a processor 201, a memory 202, a storage device 203, an I/O device 204, a recording medium device 205, and a communication interface 206.

The processor 201 may provide the functions of the communication device 40 by executing a communication program stored in the storage device 203. Accordingly, when the communication device 40 is operated as a representative node, the processor 201 provides the functions of the heartbeat generator 51, the authentication information generator 52, the authentication processor 53, and the distributor 54 by executing a communication program that describes the processes of the flowchart depicted in FIG. 8. When the communication device 40 is operated as an ordinary node, the processor 201 performs the functions of the monitor 56, the vote request generator 57, the response unit 58, the agreement decision unit 59, and the authentication information regenerator 60 by executing a communication program that describes the processes of either of the flowcharts depicted in FIGS. 9 and 10.

The memory 202 is, for example, a semiconductor memory and used as a work area for the processor 201. The storage device 203 may be implemented in, or connected to, the computer 200. The I/O device 204 accepts input of an instruction from a user or a network administrator. The I/O device 204 outputs a result of processing performed by the processor 201. The recording medium device 205 reads a signal recorded in a removable recording medium 207. The above-described communication programs may be recorded in the removable recording medium 207. The communication interface 206 includes an interface for data communications and an interface for communicating control information.

First Example

Figure 13:
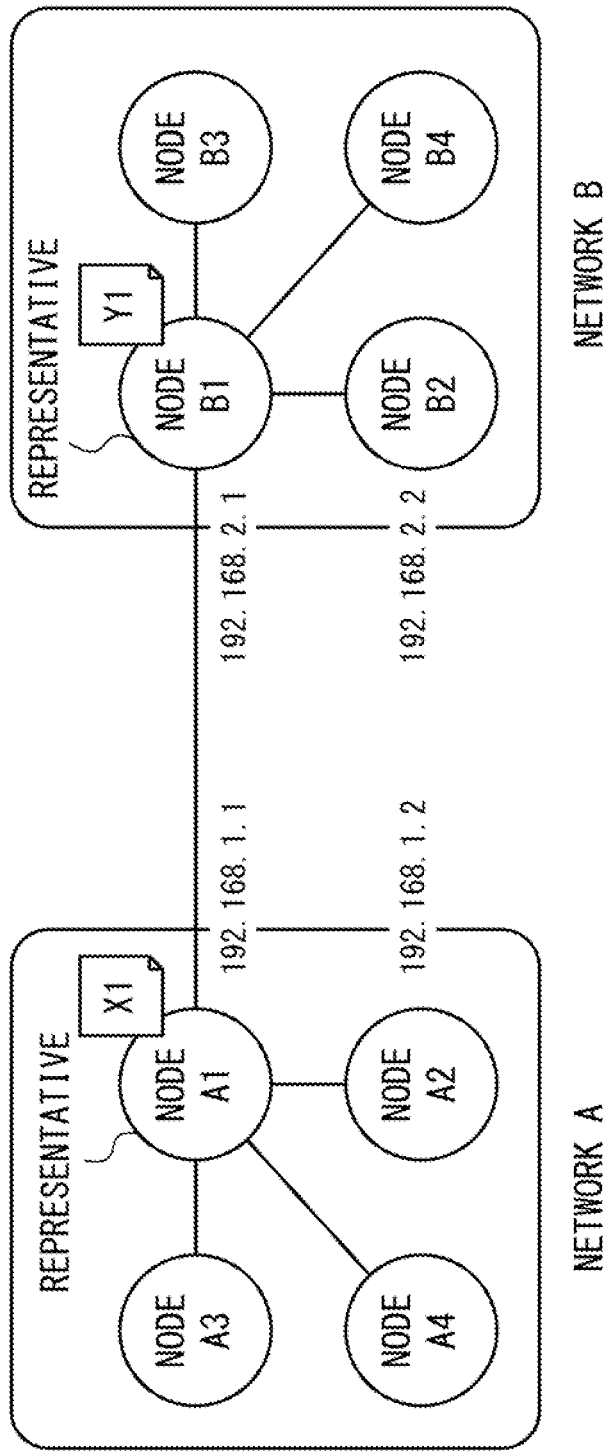
FIG. 13 illustrates a system configuration in a first example.

FIG. 13 illustrates a system configuration in a first example. In the first example, networks A and B are mutually connected. The network A includes nodes A1-A4, of which the node A1 has been selected as a representative node. The network B includes nodes B1-B4, of which the node B1 has been selected as a representative node. The node A1 holds authentication information X1, and the node B1 holds authentication information Y1. The nodes A1, A2, B1, and B2 have IP addresses as depicted in FIG. 13. Although not depicted in FIG. 13, the nodes A1-A4 and B1-B4 each hold a client certificate. The client certificates held by the nodes are preferably different from each other.

FIGS. 14A and 14B illustrate examples of authentication information. In this example, authentication information includes a user registration table and an access information table. The node A1, i.e., the representative node of the network A, holds a user registration table UA1 and an access information table DA1 depicted in FIG. 14A. The node B1, i.e., the representative node of the network B, holds a user registration table UB1 and an access information table DB1 depicted in FIG. 14B.

The user registration table includes information for deciding whether to allow an access from a representative node of another network. For example, as depicted in FIG. 14A, the user registration table UA1 of the node A1 may record identification information "representative B", which indicates the representative node of the network B, and a password "pwd_B1" for access from the network B to the network A.

An access information table includes information that is used when accessing another network. For example, as depicted in FIG. 14A, the access information table DA1 implemented in the node A1 may record information "NW_B" for identifying a network to be accessed, an IP address "192.168.2.1:80", i.e., the IP address of the representative node of the network to be accessed, identification information "representative A", which indicates the representative node of the network A, and a password "pwd_A1" for access from the network A to the network B.

FIG. 15 illustrates an example of a sequence of switching a representative node in the first example. Assume that before this sequence is started, a fault has occurred in the node A1 that had been operated as a representative node in the network A depicted in FIG. 13. Then, the node A2 runs as a candidate for a new representative node. That is, the node A2 transmits a vote request message to each node in the network A and waits for response messages and data components.

(1) The node A2 collects data components from a plurality of nodes in the network A. The node A2 regenerates authentication information X1 from the plurality of collected data components. Accordingly, the node A2 regenerates the user registration table UA1 and access information table DA1 depicted in FIG. 14A.

(2) The node A2 generates authentication information X2 by updating authentication information X1. In particular, the node A2 replaces "pwd_B1" with "pwd_B2" in the user registration table UA1 for the password for access from the network B to the network A. The node A2 also replaces "pwd_A1" with "pwd_A2" in the access information table DA1 for the password for access from the network A to the network B. As a result, a user registration table UA2 and an access information table DA2 depicted in FIG. 16A are generated. The user registration table UA2 and the access information table DA2 are included in authentication information X2.

(3) The node A2 accesses the representative node of the network B (i.e., node B1) according to the authentication information before update (i.e., the attention information X1 regenerated from a plurality of data components). In particular, the node A2 logs in to the node B1 according to the access information table DA1 depicted in FIG. 14A. Note that the new representative node (i.e., node A2) needs the authentication information that was used by the former representative node (i.e., authentication information A1), in order to access the representative node of the other network (i.e., node B1).

(4) When the login succeeds, the nodes A2 and B1 respectively check the client certificate held by the other. In this case, for example, the node A2 may transmit the client certificate of the node A2 to the node B1, and the node B1 may transmit the client certificate of the node B1 to the node A2.

(5) When both of the nodes A2 and B1 check that the client certificates are correct, the node A2 transmits a request to change a representative node address to the node B1. In this example, this address change request indicates that the address of the representative node of the network A has been changed from "node A1 (192.168.1.1)" to "node A2 (192.168.1.2)". Upon receipt of the address charge request, the node B1 changes the representative node address in the access information table DB1, as depicted in FIG. 16B.

(6) The node A2 transmits a request to change a password to the node B1. This password change request includes information indicating that the password for access from the network B to the network A has been changed from "pwd_B1" to "pwd_B2" and information indicating that the password for access from the network A to the network B has been changed from "pwd_A1" to "pwd_A2". Accordingly, when this password change request is received, the node B1 changes, as depicted in FIG. 16B, the reception password in the user registration table UB1 from "pwd_A1" to "pwd_A2" and changes the destination password in the access information table DB1 from "pwd_B1" to "pwd_B2".

The authentication process between the nodes A2 and B1 is completed through the procedure described above, thereby mutually connecting the networks A and B. Accordingly, when a fault occurs in the node A1 operated as a representative node in the network A, a new representative node will be automatically selected. Then, the new representative node of the network A performs the processing for the connection to the network B. As a result, the mutual connection between the networks is automatically recovered.

A new representative node needs authentication information that was used by a former representative node, in order to access the representative node of another network. Accordingly, the new representative node regenerates the authentication information that was used by the former representative node, by collecting data components from other nodes.

Second Example

Figure 17:
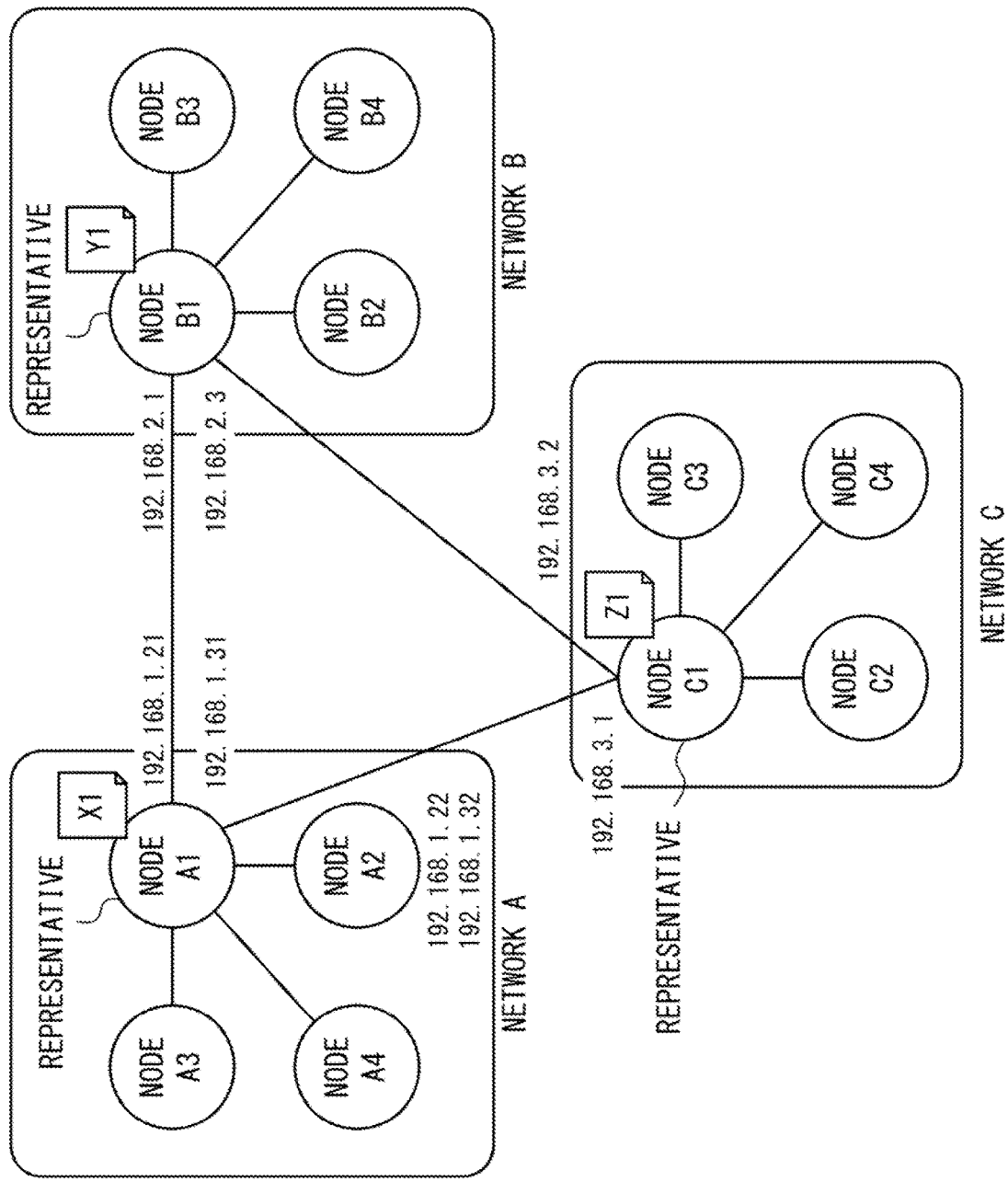
FIG. 17 illustrates a system configuration in a second example.

FIG. 17 illustrates a system configuration in a second example. In the second example, networks A-C are mutually connected. The network A includes nodes A1-A4, of which the node A1 has been selected as a representative node. The network B includes nodes B1-B4, of which the node B1 has been selected as a representative node. The network C includes nodes C1-C4, of which the node C1 has been selected as a representative node. The node A1 holds authentication information X1, the node B1 holds authentication information Y1, and the node C1 holds authentication information Z1. Although not depicted in FIG. 17, the nodes A1-A4, B1-B4, and C1-C4 each hold a client certificate.

The node A1 has two IP addresses. 192.168.1.21 is used for a connection to the network B. 192.168.1.31 is used for a connection to the network C. The node A2 has two IP addresses. 192.168.1.22 is used for a connection to the network B. 192.168.1.32 is used for a connection to the network C. The node B1 has two IP addresses. 192.168.2.1 is used for a connection to the network A. 192.168.2.3 is used for a connection to the network C. The node C1 has two IP addresses. 192.168.3.1 is used for a connection to the network A. 192.168.3.2 is used for a connection to the network B.

FIGS. 18A-18C illustrate examples of authentication information. The node A1, i.e., the representative node of the network A, holds a user registration table UA1 and an access information table DA1 depicted in FIG. 18A. The node B1, i.e., the representative node of the network 3, holds a user registration table UB1 and an access information table DB1 depicted in FIG. 18B. The node C1, i.e., the representative node of the network C, holds a user registration table UC1 and an access information table DC1 depicted in FIG. 18C.

The configurations of the user registration tables and the access information tables in the second example are substantially the same as those in the first example, and descriptions thereof are omitted herein. In the second example, however, each network is connected to the other two networks. Hence, the user registration tables and the access information tables each have two records.

Figure 19:
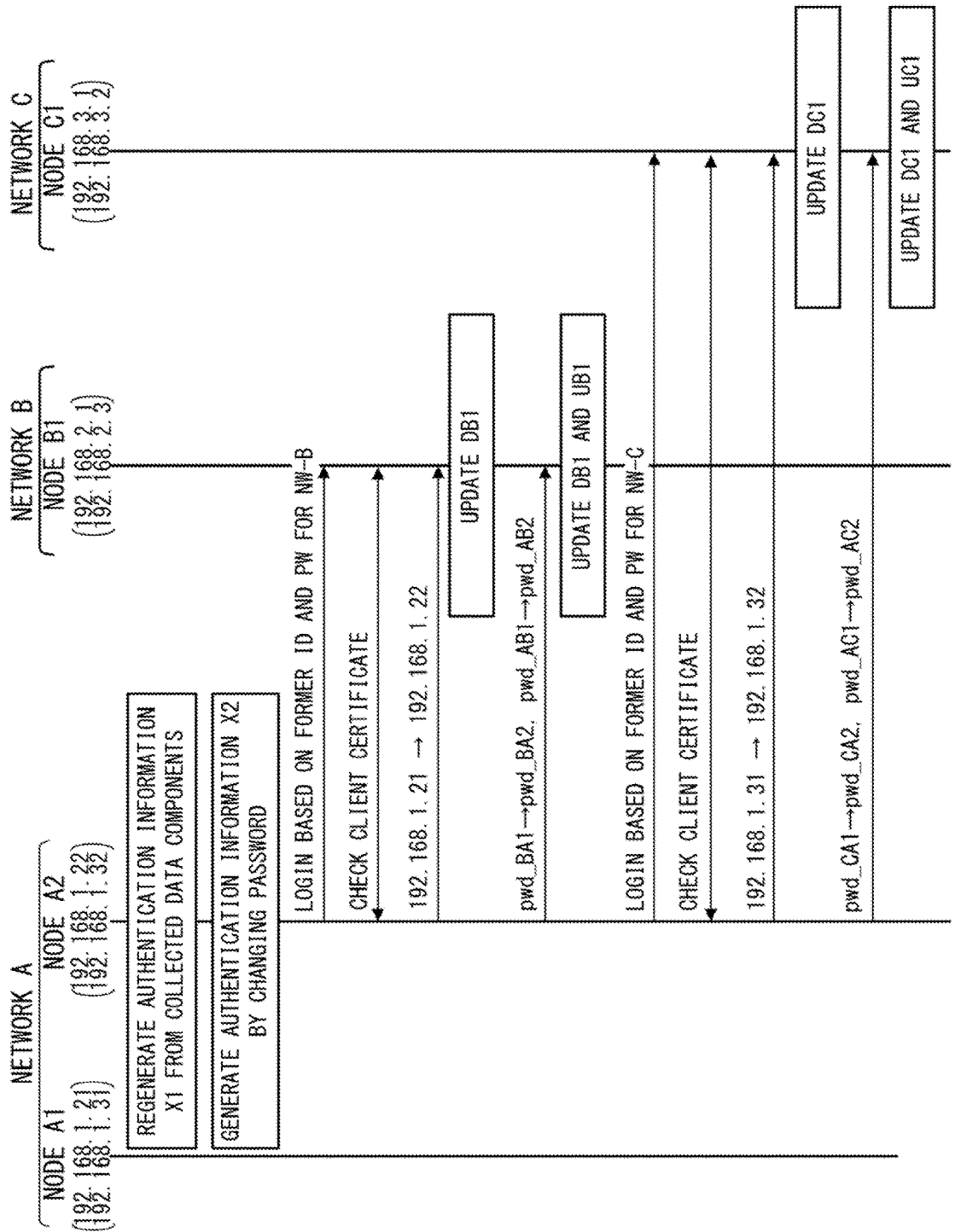
FIG. 19 illustrates an example of a sequence of switching a representative node in a second example.

FIG. 19 illustrates an example of a sequence of switching a representative node in the second example. Assume that before this sequence is started, a fault has occurred in the node A1 that had been operated as a representative node in the network A depicted in FIG. 17. In this situation, the node A2 runs as a candidate for a new representative node. Hence, the node A2 transmits a vote request message to nodes in the network A and waits for response messages and data components.

(1) The node A2 collects data components from a plurality of nodes in the network A. The node A2 regenerates authentication information X1 from the plurality of collected data components. Accordingly, the node A2 regenerates the user registration table UA1 and access information table DA1 depicted in FIG. 18A.

(2) The node A2 generates authentication information X2 by updating authentication information X1. In particular, the node A2 replaces "pwd_BA1" with "pwd_BA2" in the user registration table UA1 for the password for access from the network B to the network A and replaces "pwd_CA1" with "pwd_CA2" in the user registration table UA1 for the password for access from the network C to the network A. The node A2 also replaces "pwd_AB1" with "pwd_AB2" in the access information table DA1 for the password for access from the network A to the network B and replaces "pwd_AC1" with "pwd_AC2" for the password for access from the network A to the network C. As a result, a user registration table UA2 and an access information table DA2 depicted in FIG. 20A are generated.

(3) The node A2 accesses the representative node of the network B (i.e., node B1) by using the authentication information before update (i.e., the attention information X1 regenerated from a plurality of data components). In particular, the node A2 logs in to the node B1 according to the access information table DA1 depicted in FIG. 18A.

(4) When the login succeeds, the nodes A2 and B1 respectively check the client certificate held by the other.

(5) The node A2 transmits a request to change a representative node address to the node B1. In this example, this address change request indicates that the address of the representative node of the network A has been changed from "node A1 (192.168.1.21)" to "node A2 (192.168.1.22)". Upon receipt of the address change request, the node B1 changes the representative node address for the network A, as depicted in FIG. 20B.

(6) The node A2 transmits a request to change a password to the node B1. This password change request includes information indicating that the password for access from the network B to the network A has been changed from "pwd_BA1" to "pwd_BA2" and information indicating that the password for access from the network A to the network B has been changed from "pwd_AB1" to "pwd_AB2". Accordingly, when this password change request is received, the node B1 changes, as depicted in FIG. 20B, the reception password for the network A in the user registration table UB1 from "pwd_A31" to "pwd_AB2" and changes the destination password for the network A in the access information table DB1 from "pwd_BA1" to "pwd_BA2".

After this, the node A2 performs, for the network C, processes similar to the procedures (3)-(6) above. As a result, as depicted in FIG. 20C, the node C1 changes the representative node address for the network A in the access information table DC1. In addition, the node C1 changes, as depicted in FIG. 20C, the reception password for the network A in the user registration table UC1 from "pwd_AC1" to "pwd_AC2" and changes the destination password for the network A in the access information table DC1 from "pwd_CA1" to "pwd_CA2".

Third Embodiment

Although one representative node is implemented in each network in the examples depicted in FIGS. 13-20C, the present invention is not limited to this configuration. A plurality of representative nodes may be operated in parallel in each network so as to improve the gateway processing capacities and network scalability.

Figure 21:
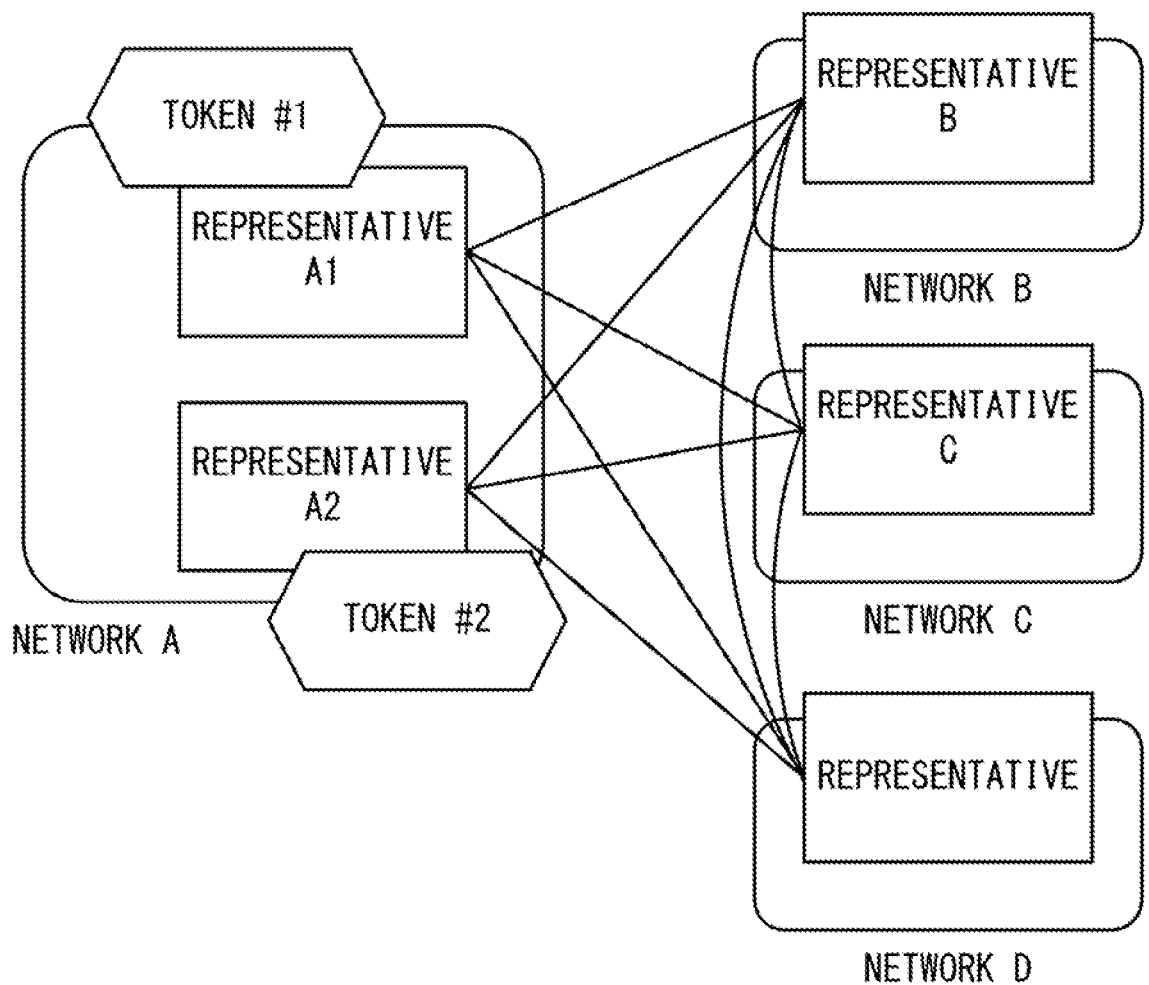
FIG. 21 illustrates an example of a configuration in which a plurality of representative nodes can be implemented in a network.

FIG. 21 illustrates an example of a configuration in which a plurality of representative nodes can be implemented in a network. In this example, a plurality of representative nodes are implemented in a network A.

A communication device that has an ability to be operated as a representative node possesses a token. A plurality of tokens may be generated in the network. A single communication device can possess a plurality of tokens.

A token dynamically indicates whether a communication device is being operated as a representative node. For example, the value of a token may be zero when the communication device is not being operated as a representative node and updated to 1 when the communication device is selected as a representative node.

A representative node is selected for each token. Thus, a plurality of representative nodes are operated in parallel in a network in which a plurality of tokens are generated. For example, the representative nodes may be selected using a method depicted in FIGS. 4A, 4B, 5A, and 5B. Accordingly, each representative node is selected according to an agreement in the network. Note that each representative node has communication paths connected to the representative nodes of the other networks in a full mesh manner.

For each token, each representative node transmits or receives a heartbeat message. When a fault has occurred in a representative node, a new representative node is selected using any of the method depicted in FIGS. 4A, 4B, 5A, and 5B. In particular, a communication device that detects that a fault has occurred in any of the representative nodes acquires at least a specified number of data components among two or more data components distributed from the faulty representative device and regenerates authentication information that corresponds to the faulty representative node. Subsequently, this communication device generates new authentication information by rewriting at least a portion of the regenerated authentication information and connects to the corresponding network according to the new authentication information. In this case, the token value for the communication device newly selected as a representative node is updated from zero to one.

Application Example

Figure 22:
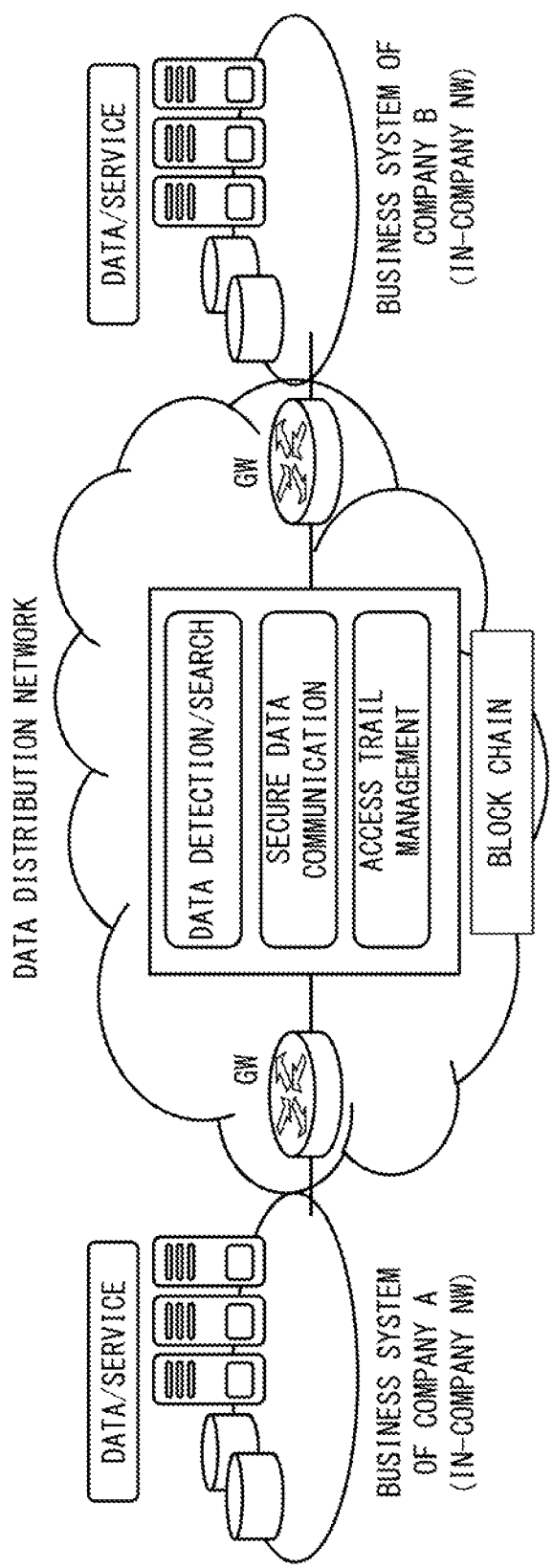
FIG. 22 illustrates an application example for a communication method in accordance with embodiments of the invention.

FIG. 22 illustrates an application example for a communication method in accordance with embodiments of the invention. In the example depicted in FIG. 22, a plurality of in-company networks are connected to a data distribution network. Using the block chain technique, the data distribution network provides a market in which data is used between the in-company networks.

A representative node is selected for each in-company network. For example, the representative nodes may be selected using any of the method depicted in FIGS. 4A, 4B, 5A, and 5B. Accordingly, each representative node is selected according to an agreement in the in-company network. The selected representative node is operated as a gateway connected to the other in-company network over the data distribution network.

The data distribution network provides data detection and search, secure data communication, access trail management, and the like. For example, these functions may be implemented by the gateways of the in-company networks. The data distribution network expands the block chain technique so that meta data indicating the compendium or attributes of data can be shared and secure data transactions can be realized. In the data distribution network, in addition, pieces of data owned by different organizations or persons will preferably be managed securely in a distributed manner. In this case, a plurality of clusters (each of which is the smallest unit for meta data distribution and corresponds to an AS in an IP) need to be established to implement a data distribution space over the networks. The representative node of each cluster serves as a gateway to communicate with the other clusters. Hence, when a fault has occurred in a representative node in a data distribution network, a new representative node also needs to be selected. Accordingly, adopting the communication method in accordance with embodiments of the present invention allows a representative node to be securely switched for mutual connections in such a data distribution network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a processor in a communication device among a plurality of communication devices that are used in a first network to execute a communication process, N (N being an integer that is two or larger) data components that are obtained by dividing authentication information for connection to a second network having been distributed from a representative device that is selected from the plurality of communication devices to N communication devices in the first network, the communication process comprising:

monitoring a first message that is periodically transmitted from the representative device;

transmitting a second message and source device information indicating an identifier or an address of the communication device to other communication devices in the first network when the first message is not detected for a specified period of time, the second message indicating that the communication device runs as a candidate for a new representative node, wherein each communication device that receives the second message in the N communication devices transmits corresponding data component stored in its local storage to the communication device when the identifier or the address of the communication device indicated by the source device information has a specified value;

receiving the data components transmitted from communication devices in the N communication devices in response to the second message;

regenerating, when a specified number of the data components or more are received, the authentication information from the specified number of data components or more;

generating new authentication information by rewriting at least a portion of the regenerated authentication information; and connecting to the second network based on the new authentication information.

2. The non-transitory computer-readable recording medium according to claim 1, the communication process further comprising:

accessing to the second network according to the regenerated authentication information; and reporting, to the second network, contents of the portion rewritten when generating the new authentication information from the regenerated authentication information.

3. The non-transitory computer-readable recording medium according to claim 1, the communication process further comprising:

distributing two or more data components obtained by dividing the new authentication information to two or more of the communication devices in the first network.

4. The non-transitory computer-readable recording medium according to claim 3, wherein the new authentication information is divided into M (M is an integer that is two or larger) data components by using Shamir's secret sharing method such that the new authentication information is regenerated from K (K is an integer that is smaller than or equal to M) data components of the M data components.

5. A communication device among a plurality of communication devices that are used in a first network, N (N being an integer that is two or larger) data components that are obtained by dividing authentication information for connection to a second network having been distributed from a representative device that is selected from the plurality of communication devices to N communication devices in the first network, the communication device comprising:

a processor configured to monitor a first message that is periodically transmitted from the representative device, transmit a second message and source device information indicating an identifier or an address of the communication device to other communication devices in the first network when the first message is not detected for a specified period of time, the second message indicating that the communication device runs as a candidate for a new representative node, wherein each communication device that receives the second message in the N communication devices transmits corresponding data component stored in its local storage to the communication device when the identifier or the address of the communication device indicated by the source device information has a specified value, receive the data components transmitted from communication devices in the N communication devices in response to the second message, regenerate, when a specified number of data components or more are received, the authentication information from the specified number of the data components or more, generate new authentication information by rewriting at least a portion of the regenerated authentication information, and connect to the second network based on the new authentication information.

6. A communication method, wherein a first communication device among a plurality of communication devices in a first network distributes N (N being an integer that is two or larger) data components obtained by dividing authentication information for connection to a second network to N communication devices in the first network, a second communication device among the plurality of communication devices monitors a first message that is periodically transmitted from the first communication device, the second communication device transmits a second message and source device information indicating an identifier or an address of the second communication device to other communication devices in the first network when the first message is not detected for a specified period of time, the second message indicating that the second communication device runs as a candidate for a new representative node, each communication device that receives the second message in the N communication devices transmits corresponding data component stored in its local storage to the second communication device in response to the second message when the identifier or the address of the second communication device indicated by the source device information has a specified value, when the second communication device receives a specified number of the data components or more from the communication devices in the N communication devices, the second communication device regenerates the authentication information from the received data components, the second communication device generates new authentication information by rewriting at least a portion of the regenerated authentication information, and the second communication device connects to the second network based on the new authentication information.

7. The communication method according to claim 6, wherein the first communication device divides the authentication information into N data components such that the new authentication information is regenerated from K (K is an integer that is smaller than or equal to N) data components of the N data components.

8. The communication method according to claim 6, wherein the second communication device distributes M (M being an integer that is two or larger) components obtained by dividing the new authentication information to M communication devices in the first network.

9. The communication method according to claim 6, wherein a plurality of tokens indicating a right to connect to a second network are generated in the first network, and the first communication device is implemented for each of the tokens.

* * * * *